(12) United States Patent
Adachi et al.

(10) Patent No.: US 6,709,122 B2
(45) Date of Patent: Mar. 23, 2004

(54) PLANE-LIKE LIGHTING UNITS AND DISPLAY EQUIPMENT PROVIDED THEREWITH

(75) Inventors: Masaya Adachi, Hitachi (JP); Ikuo Hiyama, Hitachi (JP); Makoto Tsumura, Hitachi (JP); Shusuke Endo, Mobara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/403,057

(22) Filed: Apr. 1, 2003

(65) Prior Publication Data
US 2003/0202363 A1 Oct. 30, 2003

Related U.S. Application Data

(63) Continuation of application No. 09/808,942, filed on Mar. 16, 2001, now Pat. No. 6,561,663.

(30) Foreign Application Priority Data

Aug. 31, 2000 (JP) ........................................ 2000-268374

(51) Int. Cl.[7] .............................................. G01D 11/28
(52) U.S. Cl. .......................... 362/27; 362/31; 362/225; 349/65
(58) Field of Search ............................. 362/26, 27, 31, 362/558, 225, 331; 349/62, 65; 385/901

(56) References Cited

U.S. PATENT DOCUMENTS

| 5,779,339 | A | 7/1998 | Konishi et al. |
| 6,317,177 | B1 | 11/2001 | Matsushita et al. |

FOREIGN PATENT DOCUMENTS

| JP | 2-208631 | 8/1990 |
| JP | 6-235825 | 8/1994 |
| JP | 8-320489 | 12/1996 |
| JP | 9-282921 | 10/1997 |
| JP | 11-149073 | 6/1999 |
| JP | 10096 A | * 1/2000 |
| JP | 2000-275604 | 10/2000 |

* cited by examiner

Primary Examiner—Sandra O'Shea
Assistant Examiner—Ali Alavi
(74) Attorney, Agent, or Firm—Antonelli, Terry, Stout & Kraus, LLP

(57) ABSTRACT

A lighting unit including a plurality of linear or bar-shaped light sources arranged in parallel, a light-guiding plate having a plurality of grooves to accommodate the light sources, a light diffuse reflector provided at either one side of the light-guiding plate, a first light diffuser provided at the side opposite to that which faces the light diffuse reflector of the light-guiding plate, and a light semi-transmitting reflector provided between each light source and the light diffuser. A second light diffuser is located with a clearance at the side opposite to that which faces the light-guiding plate of the first light diffuser.

3 Claims, 17 Drawing Sheets

PLANE-LIKE LIGHTING UNITS AND DISPLAY EQUIPMENT PROVIDED THEREWITH

This is a continuation of U.S. application Ser. No. 09/808,942, filed Mar. 16, 2001, now U.S. Pat. No. 6,561,663, the subject matter of which is incorporated by reference herein.

BACKGROUND OF THE INVENTION

The present invention relates to lighting units that display images by adjusting the amount of light to be transmitted, and to display equipment that uses these lighting units.

The display equipment generally used can be broadly divided into a light-emitting type, which is represented by a cathode-ray tube (CRT) display or a plasma display panel (PDP) display, and a non-light-emitting type, which is represented by a liquid-crystal display (LCD), an electrochromic display (ECD), or an electrophotoretic image display (EPID).

The non-light-emitting type mentioned above has a display panel (such as an LCD panel) that adjusts the transmittance of light, and a lighting unit provided at the rear of the display panel in order to radiate light thereto. That is to say, the display panel displays images by adjusting the amount of transmission of the light radiated from the lighting unit. Hence, the lighting unit has a very important meaning in image display.

The lighting unit in the non-light-emitting type of display equipment employs either the edge-light scheme (light-guiding plate scheme), the directly downward lighting scheme (reflection plate scheme), the plane-like light source scheme, or the like. (Bibliography: "Liquid-Crystal Display Technology," pp. 252–256, published on Nov. 8, 1996 by Sangyo Tosho K.K., and "Full-Color Liquid-Crystal Display Technology," pp. 201–202, published on Feb. 26, 1990 by K.K. Toriqueps). The edge-light scheme or the directly downward lighting scheme is mainly used for medium-size and larger types of LCD equipment.

Also, a hybrid scheme, a combination of the above-mentioned edge-light scheme and directly downward lighting scheme, has been proposed in recent years.

Examples of existing lighting units employing the hybrid scheme are shown in FIGS. 28 and 29. The general configuration of hybrid-scheme lighting units is explained using the example of FIG. 28. A light unit of the hybrid scheme is composed principally of reflection plate 450, a plurality of light sources 110a to 110c arranged in parallel on the reflection plate, a plurality of light-guiding plates 290a to 290d arranged along the longitudinal direction of the light sources, a plurality of semi-transmitting reflection means 605a to 605c arranged directly above the light sources, and light diffusion means 740 provided on the entire plane of the light radiating side. This configuration makes it possible under the hybrid scheme, as with the directly downward lighting scheme, to achieve a larger screen and higher luminance by increasing the number of light sources, and at the same time, to maintain the uniformity in the in-plane distribution of luminance by providing light-guiding plates. It is therefore possible under the hybrid scheme to implement easily a lighting unit more uniform in the luminance of light than under the directly downward lighting scheme, and higher in luminance than under the edge-light scheme. Technology relating to lighting units of the hybrid scheme is set forth in, for example, Japanese Application Patent Laid-Open Publication No. Hei-208631 (1990), Hei-214191 (1991), Hei-338723 (1992), Hei-282921 (1997), and Hei-149073 (1999).

By the way, liquid-crystal display (LCD) equipment consisting of such a lighting unit and an LCD panel poses the problem that resolution decreases during full-motion image display mode. According to "Technical Report on Signal Engineering", EID96-4, pp. 19–26, 1996, released by Ishiguro et al., the problem mentioned above is ascribed to the fact that the image display speed of the LCD panel, or the response speed of the liquid crystals, is low (several tens of milliseconds), in other words, that a display scheme, called the hold type, is employed. In this Report, one frame means one cycle of time in video signals. How and why image quality deteriorates during full-motion image display of the hold type is described as follows:

In normal real-image display mode, a moving object, for example, constantly moves and does not stop in the same position. In hold-type display mode, however, since even a moving object continues to be displayed at the same position during one entire frame, although the image at the proper position is displayed during a moment of one frame, an image different from the real image continues to be displayed during another moment. The human eye perceives these images by averaging them, and thus resolution decreases. Technology for solving this problem is reported in IDRC '97, pp. 203–206, 1998, issued by K. Sueoka et al. This technology makes it possible for image quality deterioration due to such averaging to be minimized for improved full-motion image quality by blinking the lighting unit and displaying an image only at a specific moment.

In general, a maximum luminance of at least 400 cd/m$^2$ is required for television-use display equipment to achieve dynamic image quality. Therefore, to attain such a luminance level using a non-light-emitting type of display equipment such as LCD equipment, its lighting unit needs to have a high luminance falling within the range from at least 5,000 to 8,000 cd/m$^2$, since the fact that, although this depends on resolution and/or display mode, the light transmittance of the LCD panel usually ranges from about 5 to 8 percent, must be considered. And to achieve a luminance of at least 5,000 cd/m$^2$ using a hybrid-scheme lighting unit, there is a need to use a cold cathode-ray tube (cold cathode fluorescent lamp), which is the mainstream in light sources, to use a tube current from 5 to 6 mA in order to allow for longer light source life, and to arrange a plurality of such light sources at intervals of about several tens of millimeters (or several centimeters) in parallel. This means a further increase in the number of light sources required, and accordingly, leaves pending or poses the problem that cannot be solved by achieving the uniformity of light with the conventional light-guiding plate. This problem is described below.

Conventional lighting units of the hybrid scheme can be divided into two major types: a type with flat light-guiding plates, and a type that uses plate-shaped members of the wedge type in its cross sectional structure.

FIGS. 28 and 29 are schematic block diagrams (partly cross-sectional diagrams) of lighting units of the hybrid scheme; one lighting unit using flat light-guiding plates, and one lighting unit using wedge-type light-guiding plates.

FIG. 28 shows a lighting unit that uses flat light-guiding plates 290a to 290d, and FIG. 29 shows a lighting unit that uses wedge-type light-guiding plates 290a to 290d. Wedge-type light-guiding plates 290b and 290c in FIG. 29 are butted to the respective thin edges.

First, problems associated with the structure of a lighting unit having flat light-guiding plates are described below.

As exemplified in FIG. 28, since the light-guiding plates have a flat shape, part of the light (for example, beam 1010 in the figure) that has been radiated from the light source (here, attention is paid to light source 110a in the figure) and has entered the corresponding light-guiding plate leaks to the light source side located next (here, light source 110b in the figure). Part of the light that has leaked is absorbed or dissipated by the phosphor of the light source located next, and as a result, the light is lost and cannot be used for lighting. For a flat light-guiding plate, therefore, the problem remains unsolved that since the rate of radiated light to the light which can be used for lighting is small (namely, the utilization efficiency of the source light is low), high luminance cannot be easily obtained, and this problem also is more significant for light sources arranged at shorter intervals. Therefore, this problem cannot be ignored since it is particularly significant in the lighting unit of TV-use LCD equipment that requires an light source arrangement interval of about several tens of millimeters.

Next, problems associated with the structure of a lighting unit having wedge-type light-guiding plates are described below.

Compared with the lighting unit of FIG. 28, the lighting unit in FIG. 29 that includes light-guiding plates having a wedge-type butted plate-shaped members in their cross-sectional structure decreases in the amount of light lost by the light source located next. For this reason, the lighting unit shown in FIG. 29 offers higher luminance than that achievable using the lighting unit whose light-guiding plates are flat in shape. However, at portion 10002 (the thinnest portion) of each light-guiding plate, since its cross section has a discontinuous portion, the luminescent lines corresponding to this discontinuous portion occur and reduces the uniformity in the in-plane distribution of luminance. In addition, the distribution of light in its traveling direction, after being radiated along the light-guiding plate, changes at the thinnest portion 10002, and along with this, the distribution of light in its traveling direction, after being radiated from the lighting unit, also changes. That is to say, there occurs the problem that the repetition of changes in contrast at the boundary between the thinnest portion 10002 of the light-guiding plate and the portion directly above the light source, namely, the nonuniformity of luminance, is made perceivable to the persons 5000a and 5000b who observe from diagonal directions.

This means that for the conventional lighting units of the hybrid scheme, design considerations relating to the simultaneous achievement of the high luminance and in-plane uniformity of luminance required for the implementation of LCD equipment suitable for TV use are not contained, these requirements are difficult to satisfy at the same time.

SUMMARY OF THE INVENTION

Accordingly, one of the major objects of the present invention is to supply a thin-type lighting unit offering sufficient luminance to enable use in TV applications, and ensuring high in-plane uniformity in luminance.

Full-motion image display performance is another important factor in TV-used is play equipment. As described earlier, image quality deterioration during full-motion image display with LCD equipment of the hold scheme can be suppressed by blinking its lighting unit. This method, however, requires significant reduction in the response time of the liquid crystals, since the lighting unit needs to be activated after data has been first sent to the entire display area of the LCD panel and then responses have been made from the liquid crystals provided in the entire display area of the LCD panel. For example, if one frame of time is taken as 16.6 msec and it takes 9.0 msec to scan the entire display area of the LCD panel, the liquid crystals must respond within 7.6 msec before a lighting time can be provided for the lighting unit to establish the intended function of the display equipment.

Another object of the present invention takes the above situation into account and is also to implement LCD equipment capable of suppressing full-motion image quality deterioration and displaying natural full-motion images.

According to one aspect of light units based on the present invention, it is possible to supply a lighting unit comprising: a plurality of linear or bar-shaped light sources arranged in parallel, a plurality of light-guiding plates arranged along both longitudinal sides of said light sources, a light diffuse reflection means provided at either one side of each of said light-guiding plates, a light diffusion means provided at the side opposite to that which faces the light diffuse reflection means of each light-guiding plate, and a light semi-transmitting reflection means provided between each light source and said light diffusion means; wherein said lighting unit is characterized in that the side of the light-guiding plate that faces the light diffuse reflection means is flat, in that the cross section of the light-guiding plate includes an inclined face of a curvilinear shape that thins down as the inclined face is more distanced from the light source, and in that when a position relatively near the light source and a position relatively far from the light source, on the surface of the light-guiding plate, are inclined by $\theta n2$ and $\theta f2$, respectively, with respect to the reverse side of the light-guiding plate, both high luminance and the in-plane uniformity of luminance can be obtained at the same time by satisfying the relationship of $\theta n2 \geq \theta f2$ and assigning an angle-of-inclination of essentially 0 degrees to the thinnest portion on the surface of the light-guiding plate.

According to another aspect of light units based on the present invention, it is possible to supply a lighting unit comprising: a plurality of linear or bar-shaped light sources arranged in parallel, a plurality of light-guiding plates arranged along both longitudinal sides of said light sources, a light diffuse reflection means provided at either one side of each of said light-guiding plates, a light diffusion means provided at the side opposite to that which faces the light diffuse reflection means of each light-guiding plate, and a light semi-transmitting reflection means provided between each light source and said light diffusion means; wherein said lighting unit is characterized in that the use of light-guiding plates made of laminated wedge-type plate-shaped members in cross section suppresses the loss of light, caused by the absorption of leakage light by the light source located next, and thus ensures both high luminance and the in-plane uniformity of luminance at the same time.

DETAILED DESCRIPTION OF THE PREFERRED EMBODIMENT

Several embodiments of the present invention are described below seeing figures.

(Embodiment 1)

Figure 1:
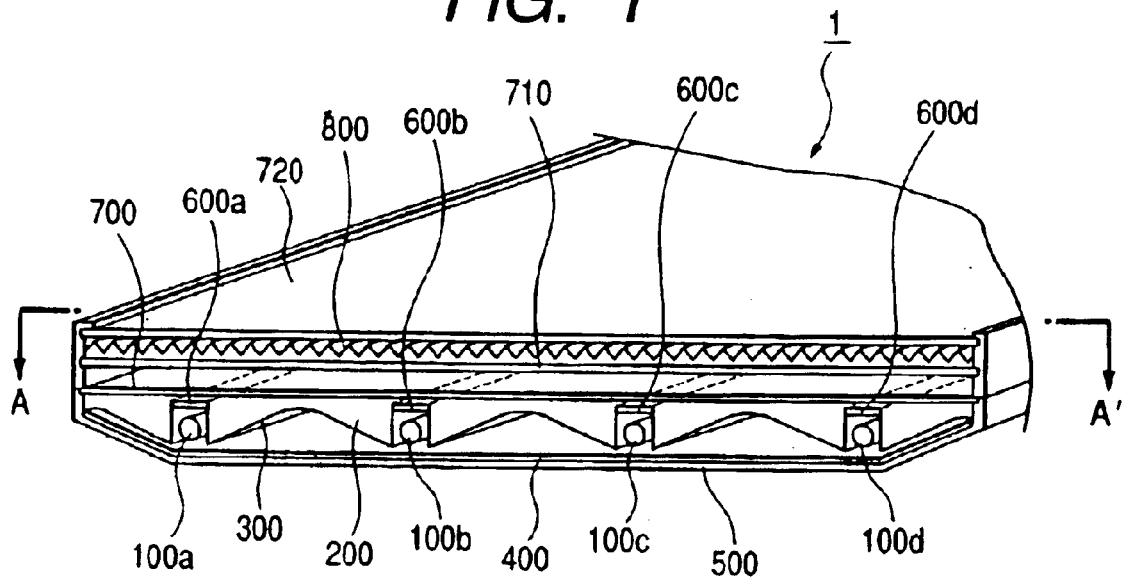
FIG. 1 is a partly cross-sectional schematic diagonal view showing a lighting unit based on the present invention.
Figure 2:
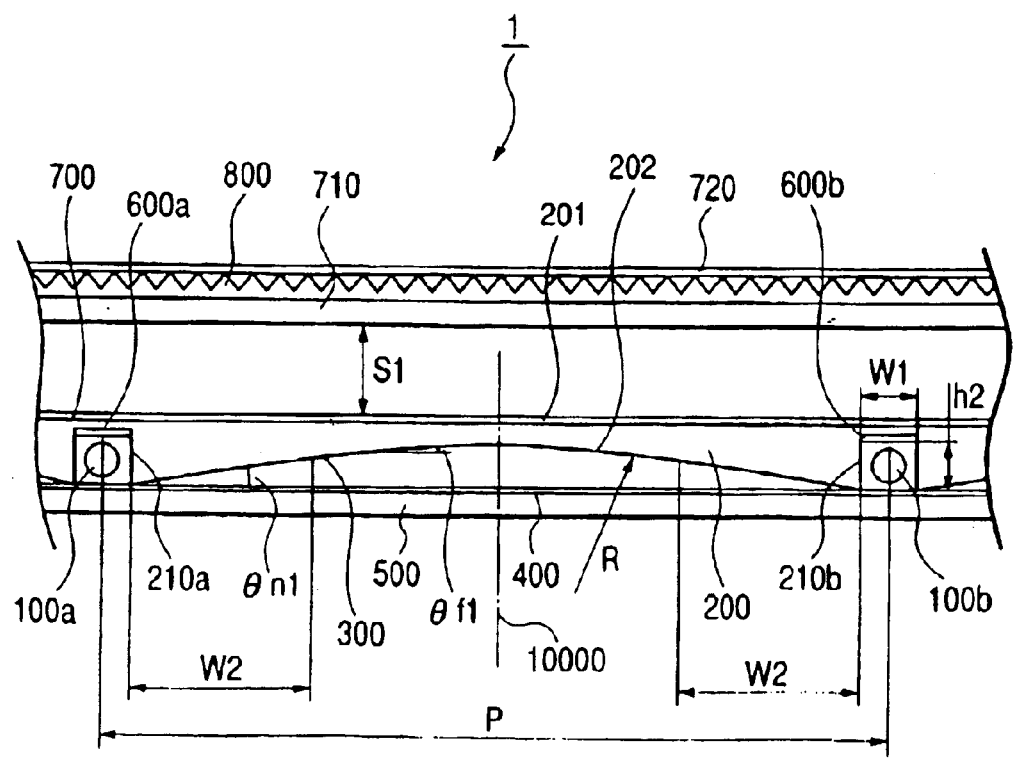
FIG. 2 is a partly cross-sectional schematic block diagram of a lighting unit based on the present invention.
Figure 3:
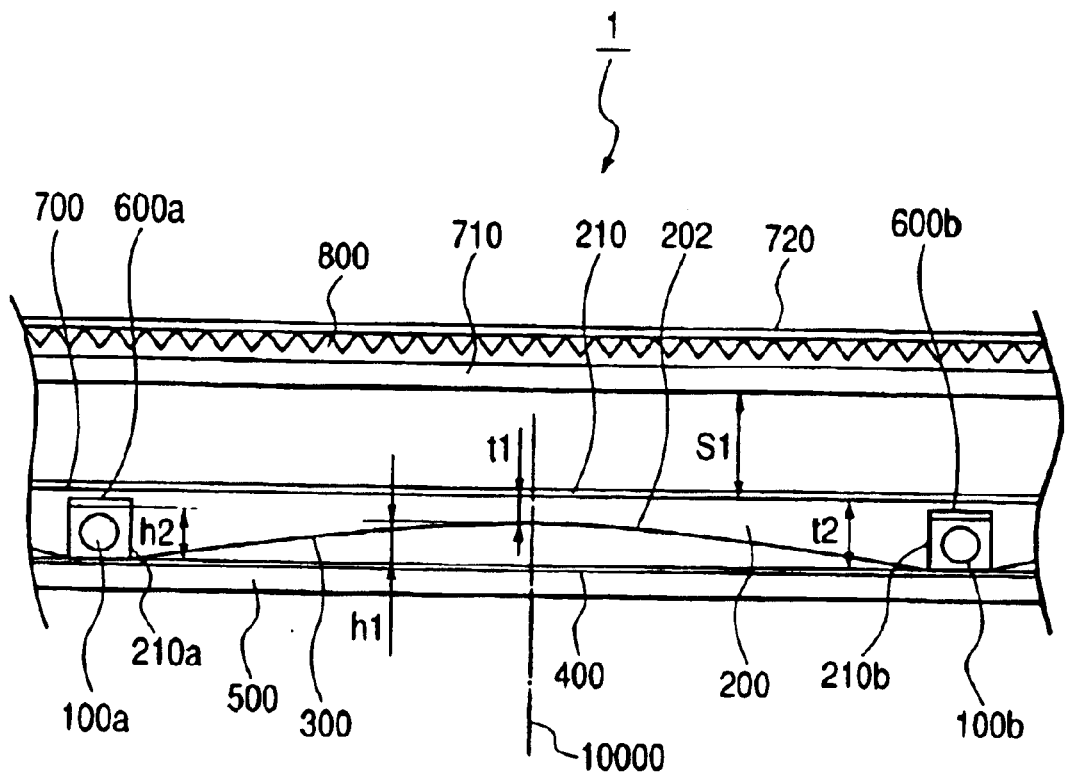
FIG. 3 is a partly cross-sectional schematic block diagram of another lighting unit based on the present invention.

FIG. 1 is a schematic diagonal view showing a lighting unit of the present invention in partial cross section. FIGS. 2 and 3 are cross-sectional schematic views showing one portion of a lighting unit based on the present invention.

First, embodiment 1 is outlined using FIG. 1. The lighting unit pertaining to this embodiment is located at the rear of the display panel (not shown) which displays images by adjusting the amount of light to be transmitted, and allows the light to enter the display panel from the rear. It is effective to use as the display panel a longer-lived LCD panel capable of displaying matrixes.

Lighting unit 1 is composed of: a plurality of light sources 100 (in FIG. 1, 100a, 100b, 100c, and 100d) having parallel-arranged linear or bar-shaped light-emitting portions; a light-guiding plate 200 having a plurality of grooves to accommodate light sources 100; a light diffuse reflection means 300 provided on the reverse side of light-guiding plate 200; a plurality of light semi-transmitting reflection means 600 (in FIG. 1, 600a, 600b, 600c, and 600d) provided directly above light sources 100; a first light diffusion means 700 provided at the surface side of light-guiding plate 200; a second light diffusion means 710 provided at a fixed distance from the first diffusion means 700; an optical path changing means 800 provided on the second light diffusion means 710; a third light diffusion means 720; a reflection means 400 at the rear of each light source 100, and; a frame 500.

(Hereinafter, the linear or bar-shaped light sources are represented simply as the bar-shaped light sources.)

Next, description is made using FIG. 2.

It is preferable that light sources 100 be smaller in size, higher in emission efficiency, and lower in the amount of heat generated. These light sources can consist of, for example, either an arrangement of multiple cold cathode tube or hot cathode tube fluorescent lamps, an arrangement of light-emitting diodes (LEDs), or an arrangement of linear light-emitting portions that use LEDs and bar-shaped light-guiding means. Embodiment 1 uses four cold cathode tube fluorescent lamps 2.6 mm in tube diameter, and these lamps are arranged at pitches of 61.4 mm. If a color LCD panel is used as the display panel, the maximum emission wavelength of each light source should be matched to the transmission spectrum of the color filter in the corresponding LCD panel. Light source 100 is connected to a power supply and a control means (not shown), and the lighting and blinking of the lighting unit are controlled by the power supply and the control means. To use cold cathode tube fluorescent lamps, an inverter should be inserted between the DC power supply and the light source.

Light-guiding plate 200 is composed of plate-like members transparent to visible light, and a plurality of grooves for accommodating light sources 100 are provided on the reverse side of the light-guiding plate. Although surface 201 of light-guiding plate 200 is flat, the cross-sectional shape of reverse side 202 is curved (or inclined) so that its thickness decreases with an increase in the distance from the light source.

The angle-of-inclination of reverse side 202 of the light-guiding plate with respect to a plane parallel to surface 201 of the light-guiding plate continuously decreases as the distance from the light source increases, and the angle of inclination is essentially 0 degrees at the thinnest portion 10000 of the light-guiding plate (except for the grooves, and hereinafter, this portion is referred to simply as the thinnest portion). In this case, the angle-of-inclination of reverse side 202 of the light-guiding plate can be equal in some areas. In other words, when any two points are selected and the angle-of-inclination of the portion closer to, and that of the portion farther than, the light source are taken as $\theta n1$ and $\theta f1$, respectively, $\theta n1$ must be equal to or greater than $\theta f1$.

Next, the relationship between the groove and the light-guiding plate is described using FIG. 3.

When the height of the side portion of the light source accommodation groove in light-guiding plate 200, from the lower end of the reverse side of the light-guiding plate to the thinnest portion on the reverse side thereof, is taken as h1 and the height of the side portion of light-guiding plate 200 is taken as h2, the value of h1/h2 in embodiment 1 of the lighting unit is 0.75. For the reasons that follow in this SPECIFICATION, in order to obtain better results from the present invention, it is desirable that the value of h1/h2 be greater than 0.75.

Figure 4:
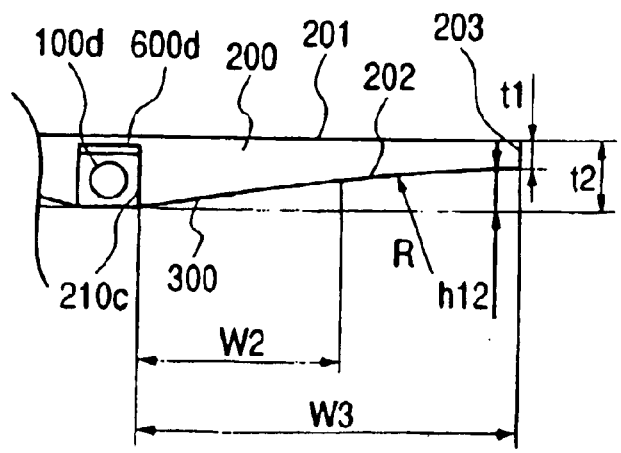
FIG. 4 is a partly cross-sectional view showing the light-guiding plate of a lighting unit based on the present invention.

Next, light-guiding plate 200 in this embodiment is described in detail taking FIGS. 1 to 3 into consideration and using FIG. 4.

FIG. 4 is a cross-sectional view showing part of the light-guiding plate 200 pertaining to a lighting unit of the present invention, and is also a schematic block diagram showing the vicinity of the end of the light-guiding plate.

The outline dimensions of light-guiding plate 200 are 317.7 mm by 245.6 mm, and its maximum thickness, t2, is 5.0 mm. The outline dimensions of the light-guiding plate apply to display equipment whose display areas are 38 cm in diagonal dimension. Also, light-guiding plate 200 has four 61.4 mm-pitched grooves to accommodate light sources.

When cold cathode fluorescent lamps are to be used as light sources, it is desirable that for the purposes of minimizing decreases in luminance due to excessive temperature increases and improving the efficiency of incidence of light from light sources 100 into light-guiding plate 200, the size of the grooves be larger than that of the light sources. More specifically, a clearance from 0.7 to 1.0 mm or more should be provided between each light source and the light-guiding plate. In embodiment 1, rectangular grooves 4.0 mm in height "h2" (the height of the plane of incidence) and 4.6 mm in width "W1" are provided to measure up to the diameter of 2.6 mm of the cold cathode fluorescent lamps used as the light sources, and these light sources are arranged in the centers of the grooves. In areas not sandwiched between the light sources of the light-guiding plate 200, therefore, width "W3" from the plane of incidence (210c, for example) to the end 203 of the light-guiding plate is 28.4 mm.

The shape of the reverse side of the light-guiding plate 200 is as described below. The area from the plane of incidence on light-guiding plate 200 (namely, the side of each light source accommodation groove in the light-guiding plate) to the dimension of W2=14.2 mm is fixed at an angle-of-inclination of about 8 degrees, and areas more distanced from the plane of incidence than that position are curved surfaces 101.3 mm in radius "R". In this configuration, therefore, a portion 30.7 mm away from the central position of the light source is the thinnest portion 10000 of the light-guiding plate 200. Also, at the end (in FIG. 4, 203) of the light-guiding plate 200 and the thinnest portion 10000 thereof, the angle-of-inclination of the reverse side of the light-guiding plate is 0 degrees and thickness "t1" is 2 mm.

Resin transparent to visible light can be used as the material for light-guiding plate 200, and this resin material can be either the acrylic resin or noncrystalline olefin resin mainly used for the conventional light-guiding plates in the edge-light scheme. In embodiment 1, the shape of the light-guiding plate becomes more complex than that of a light-guiding plate of the edge-light scheme. To improve the yield in molding, therefore, it is effective to use cycloolefin polymer (COP) whose fluidity in molding is higher than acrylic. Such resin is commercially available from Japan Zeon under the tradename of ZeoNoah. Also, COP, because of its low hygroscopicity compared with that of acrylic, provides the effect that since such light-guiding plate as shown in embodiment 1 greatly changes in thickness, warping due to moisture absorption can be suppressed. In addition, COP has the feature that since its density is 20% lower than that of acrylic, the light-guiding plate can be reduced in weight. At present, however, COP has the problem that it tends to become slightly yellowish. This problem cannot be ignored if, as in the side-light scheme, the light that has entered the light-guiding plate is to be propagated through a long distance to match the size of the radiation destination (for example, the screen of an LCD panel). For the lighting units of the present invention, however, since the propagation distance from the entry of a large portion of light to the exit from the light-guiding plate is only about half the pitch of the light sources, the light is not too susceptible to any effects of the light-guiding plate material. In short, the tendency of COP to become slightly yellowish can be suppressed.

In this SPECIFICATION and in related drawings, the area where grooves are formed, and the area where curved surfaces are formed, are shown as the same. Provided, however, that the effectiveness of all embodiments of the present invention can be achieved, these areas do not always need to be the same. That is to say, grooves and curved surfaces can be provided in opposite areas.

Next, light diffuse reflection means 300 provided on reverse side 202 of light-guiding plate 200, except for its grooves, is described below.

Light diffuse reflection means 300 has a function that changes the angle of reflection of the light propagating through light-guiding plate 200 and lets the light go out from the surface 201 of the light-guiding plate. Light diffuse reflection means 300 can be constructed by patterning a light diffusion means (such as white pigment ink) on the reverse side 202 of the light-guiding plate or forming on the reverse side 202 of the light-guiding plate a light diffusion means that consists of a great number of very small undulations or stepped portions having an inclined surface, and then providing the back of this light diffusion means with a reflection sheet having a plane-of-reflection formed on its supporting substrate such as a high polymer film. Although, in embodiment 1, light diffuse reflection means 300 has a reflection sheet directly attached to the entire reverse side 202 of a light-guiding plate using a transparent adhesive, the present invention is not limited by such an arrangement.

Next, semi-transmitting reflection means 600 provided directly above the grooves for accepting light sources 100 is also described.

Semi-transmitting reflection means 600 (in FIG. 4, 600d) has a function by which, of all the light leaving the light source 100, only one portion of the light going upward will be transmitted and the rest will be reflected to go towards the side walls of each groove in light-guiding plate 200, namely, the planes of incidence on the light-guiding plate. Semi-transmitting reflection means 600 also has a function by which the strong light leaving the light source and going towards the immediate top thereof will be intercepted and thus the occurrence of luminescent lines directly above the light source will be suppressed to enhance the in-plane uniformity of luminance. For this reason, the light-emitting intensity of the light source should be taken into consideration when the transmittance of light of the semi-transmitting reflection means 600 is set, and this value should be set to a value smaller than the reflectance of the light. It is also desirable that the light, when transmitted, should be scattered for enhanced in-plane uniformity of its luminance. In addition, to improve the utilization efficiency of light, it is desirable that semi-transmitting reflection means 600 should use a material as low as possible in terms of light absorption coefficient. More specifically, the functions of the semi-transmitting reflection means can be implemented by including air or fine-structured transparent bodies or white pigments (or the like) of different reflectances in a transparent substrate or by coating a transparent supporting substrate with a white pigment or by coating or printing the immediate top of the light source of the light-guiding plate directly with a white pigment. If coating or printing with a white pigment is to be used, it will be useful to enhance the in-plane uniformity of luminance by, for the immediate top of the light source, increasing the coating thickness or the printing density or providing no clearances, and as the distance from the light source increases, continuously reducing the coating thickness or the printing density or the shielding area. The semi-transmitting reflection means 600 shown in embodiment 1 uses a sheet made of polyethylene terephthalate (PET) having a reflectance of 86% (this sheet is manufactured by Fujimoto Electric Machine under the tradename of RF75). Although, in embodiment 1, a 4.6 mm-width slot-shaped semi-transmitting reflection means is provided directly above the light source in the grooved portion of the light-guiding plate, the present invention is not limited by such an arrangement.

Description is continued below using FIG. 3 again.

Reflection means 400 is positioned on the reverse side of light source 100. Reflection means 400 has a function that reflects the outgoing light from light source 100 and increases the amount of light which enters light-guiding plate 200 from the sidewalls of the grooves in light-guiding plate 200, namely, from the planes of incidence on the light-guiding plate. Reflection means 400 can be constructed by forming high-reflectance planes of reflection on a resin plate or a supporting substrate such as a high polymer film. These planes of reflection can be created by either depositing a high-reflectance metallic thin film, such as aluminum or silver, on the supporting substrate, forming a film by spattering or the like, forming a dielectric multi-layered film on the supporting substrate so as to increase the reflectance of this film, or coating the supporting substrate with a white pigment. Or the lamination of several layers of transparent media different in reflectance can provide the functions required of the reflection means. In embodiment 1, a reflection sheet with a plurality of diffuse reflection layers formed in laminated form on a supporting substrate film is used as reflection means 400 (this reflection sheet is manufactured by Mitsui Chemical Corp. under the tradename of Ref-Star).

A first light diffusion means 700 is provided over the entire surface 201 of light-guiding plate 200. The first light diffusion means 700 achieves the uniformity in the outgoing angle distribution of the light leaving the light-guiding plate, and the in-plane uniformity in the luminance of the light. The first light diffusion means 700 can use either a transparent high polymer film, such as PET or PC (polycarbonate), that has an undulated surface, a high polymer film on which a diffusion layer consisting of a combination of a transparent medium and light-transmitting fine particles different from the transparent medium in terms of reflectance is formed, a plate or film in which air bubbles are included to provide diffusion characteristics, or a milky-white member having a white pigment dispersed in a transparent member such as acrylic resin. Although two diffusion sheets (tradename: D121, manufactured by Fujimoto Electric Machine), which use PET as their substrate film, are arranged on light-guiding plate 200 in order to form the first light diffusion means shown in embodiment 1, the present invention is not limited by such an arrangement.

On the first light diffusion means 700, a second light diffusion means 710 is positioned with a fixed clearance of S1 for the reason set forth below. As with the first light diffusion means 700, the second light diffusion means 710 is intended to achieve the uniformity in the outgoing angle distribution of the light leaving the light-guiding plate, and the in-plane uniformity in the luminance of the light. For this reason, the second light diffusion means, as with the first light diffusion means, can use either a transparent high polymer film, such as PET or PC (polycarbonate), that has an undulated surface, a high polymer film on which a diffusion layer consisting of a combination of a transparent medium and light-transmitting fine particles different from the transparent medium in terms of reflectance is formed, a plate or film in which air bubbles are included to provide diffusion characteristics, or a milky-white member having a white pigment dispersed in a transparent member such as acrylic resin. Since the second light diffusion means is positioned at a fixed clearance with respect to the first light diffusion means, although it is desirable that an independent supporting member be provided, a light diffusion means having rigidity in itself can also be used as its supporting member. Such a light diffusion means can be a plate-like means made of a material several millimeters thick, such as acrylic resin. More specifically, a product manufactured by Nittoh Resin Industries, Inc., under the tradename of CLA-LEX DR-IIIC, can be used. When this product is to be used, it is preferable that the amount of its flexure be minimized and that its thickness be limited to 2 mm so as to minimize the thickness and weight of the lighting unit. Still another preferred method of forming the second light diffusion means would be by using a transparent acrylic resin plate as the supporting member and laminating diffusion sheets thereonto. In order to construct the second light diffusion means shown in embodiment 1, a plurality of diffusion sheets (tradename: D121, manufactured by Fujimoto Electric Machine), which use PET as their substrate film, are arranged in laminated form on the 2 mm-thickness transparent acrylic resin plate used as the supporting member. Also, in embodiment 1, although the clearance between the first light diffusion means 700 and the second light diffusion means 710 is 9 mm, the present invention is not limited by such an arrangement.

Optical path changing means 800 is provided on the second light diffusion means 710. Optical path changing means 800 has a function that corrects the different traveling directions of the light which has passed through the first light diffusion means 700 and the second light diffusion means 710, and this function corrects the different traveling directions of the light at least at a position orthogonal to the longitudinal direction of light source 100 so that each traveling direction will change to the front direction. A means of achieving such a function is set forth in Japanese Application Patent Laid-Open Publication No. Hei-37801 (1989)—Title of the Invention: Lighting Panel. A transparent sheet consisting of a flat and smooth surface and a corrugated surface can also be used. In embodiment 1, as shown in FIG. 3, one transparent sheet having a flat and smooth surface on one side of the light-guiding plate 200 and a corrugated surface on the other side is used as optical path changing means 800. Such a transparent sheet is marketed by 3M Inc. (U.S.A.) under the tradename of RBEF, BEFIII, or Wave Film, and this sheet is ideal as the optical path changing means in the present invention. In embodiment 1, a prism that forms a corrugated surface has an average pitch of 50 microns, an angle of 90 degrees, and a radius of 8 microns at its round end, is used as optical path changing means 800, and the prism is located with its longitudinal direction approximately matching the longitudinal direction of the light source 100. The actual working effect of optical path changing means 800 is described in detail later in this SPECIFICATION.

A third light diffusion means 720 is provided on optical path changing means 800. The third light diffusion means 720 achieves the uniformity in the outgoing angle distribution of the light which has passed through the optical path changing means, and the in-plane uniformity in the luminance of the light. The sheet used as the optical path changing means, easily gets damaged, and for this reason, the third light diffusion means 720 can also function as a protective layer for the optical path changing means. As with the first light diffusion means and the second light diffusion means, the third light diffusion means can use either a transparent high polymer film, such as PET or PC (polycarbonate), that has an undulated surface, a high polymer film on which a diffusion layer consisting of a combination of a transparent medium and light-transmitting fine particles different from the transparent medium in terms of reflectance is formed, a plate or film in which air bubbles are included to provide diffusion characteristics, or a milky-white member having a white pigment dispersed in a transparent member such as acrylic resin. Although diffusion sheets (tradename: D117, manufactured by Fujimoto Electric Machine), which use PET as their substrate film, are arranged to form the third light diffusion means shown in embodiment 1, the present invention is not limited by such an arrangement.

Frame 500 functions to support and fix the light-guiding plates, light diffusion means, optical path changing means, and other components of lighting unit 1, and is made of metallic, resin, and other materials.

Figure 5:
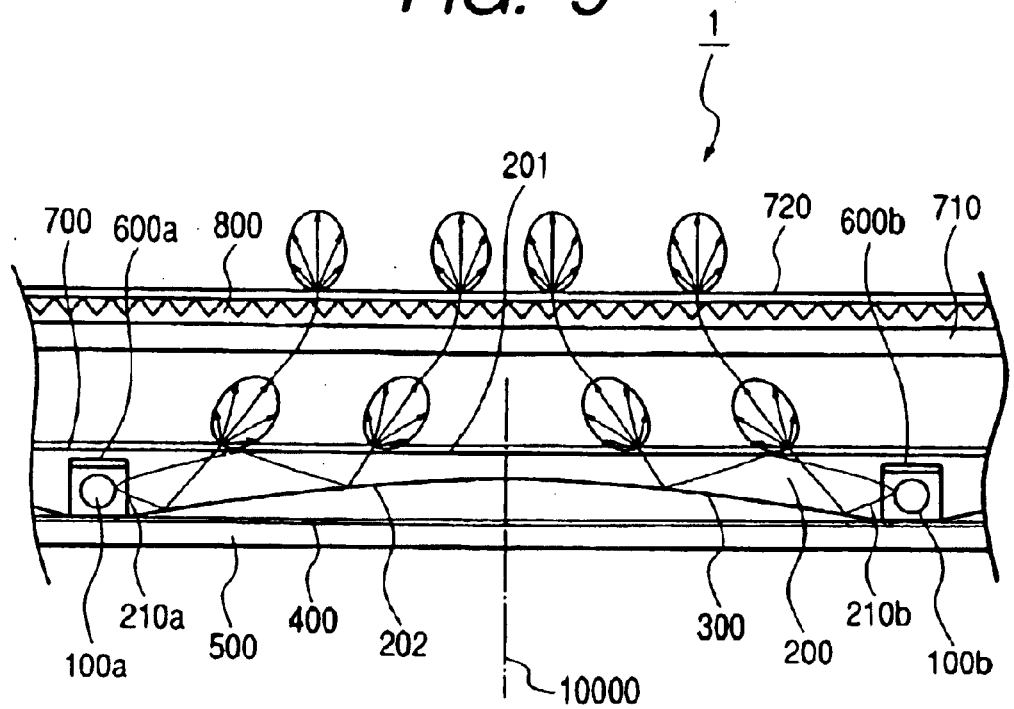
FIG. 5 is a partly cross-sectional schematic block diagram of still another lighting unit based on the present invention.

Next, the operation of the lighting unit in embodiment 1 is described using FIG. 5, a schematic block diagram showing part of the lighting unit in cross section.

After light has been radiated from light sources 100 (in FIG. 5, 100a and 100b, for example) and then reflected directly or via reflection means 400 and/or the like, the light enters light-guiding plate 200 from the planes of incidence provided thereon, namely, both sides (in FIG. 5, 210a and 210b) of the groove in light-guiding plate 200. Of all the light that has been radiated from light sources 100, only one portion of the light which has reached a plurality of semi-transmitting reflection means 600 (in FIG. 5, 600a and 600b, for example) passes through the semi-transmitting reflection means and the remainder, after reflecting directly or via light sources 100 and reflection means 400, enters light-guiding plate 200.

Light that has entered light-guiding plate 200 propagates through it while repeatedly reflecting at the surface 201 and reverse side 202 of the light-guiding plate and at the light diffuse reflection means 300 provided on the reverse side 202 of the light-guiding plate. And among all the light that has reflected at the light diffuse reflection means 300 provided on the reverse side 202 of the light-guiding plate, only light that has entered the surface 201 of the light-guiding plate at an angle deviating from the conditions of total reflection, namely, an angle smaller than its critical value, leaves the surface 201 of the light-guiding plate. Light that has thus left the surface 201 of the light-guiding plate is enhanced in terms of the uniformity in in-plane luminance distribution and the uniformity in traveling direction, by the first light diffusion means 700 and the second light diffusion means 710, and then the light enters the optical path changing means 800. After the light has entered the optical path changing means, the different traveling directions of the light are corrected, then the directionally corrected light passes through the third light diffusion means 720, and is radiated from lighting unit 1. When light that has been radiated from light sources 100 and passed through the semi-transmitting reflection means 600 is then routed along the first light diffusion means 700, the second light diffusion means 710, the optical path changing means 800, and the third light diffusion means 720, the uniformity in the in-plane distribution of luminance and the uniformity in the traveling direction of the light are enhanced before the light is radiated from lighting unit 1.

The effectiveness of optical path changing means 800 pertaining to the present invention is detailed below. As shown in FIG. 5, for the lighting unit of the hybrid scheme that decreases in the thickness of the light-guiding plate with an increase in its distance from each light source, the position where the principal traveling direction of the light which has left the surface 201 of the light-guiding plate 200 becomes orthogonal with respect to the longitudinal direction of the light source changes at the boundary between the thinnest portion 10000 of the light-guiding plate and the portion directly above the light source. Accordingly, there occurs the problem that unless the different traveling directions of the light are corrected, alternate repetition of changes in contrast at the boundary between the thinnest portion 10000 of the light-guiding plate and the portion directly above the light source will result in the nonuniformity of luminance when the light is observed from a diagonal direction. Of course, the different traveling directions of the light which has left the light-guiding plate can be made uniform to a certain degree by a light diffusion means. To correct the different traveling directions of the light only by use of a light diffusion means, this light diffusion means needs to have excellent light diffusion performance characteristics (for example, higher performance in Hayes value). However, the use of a light diffusion means high in light diffusion performance usually reduces transmittance, and this poses another problem that the luminance of the lighting unit decreases. This is because, under the present invention, optical path changing means 800 is provided to correct the different traveling directions of light so that the occurrence of the nonuniformity in luminance during viewing from a diagonal direction can be prevented without significant decreases in the luminance itself.

Figure 6:
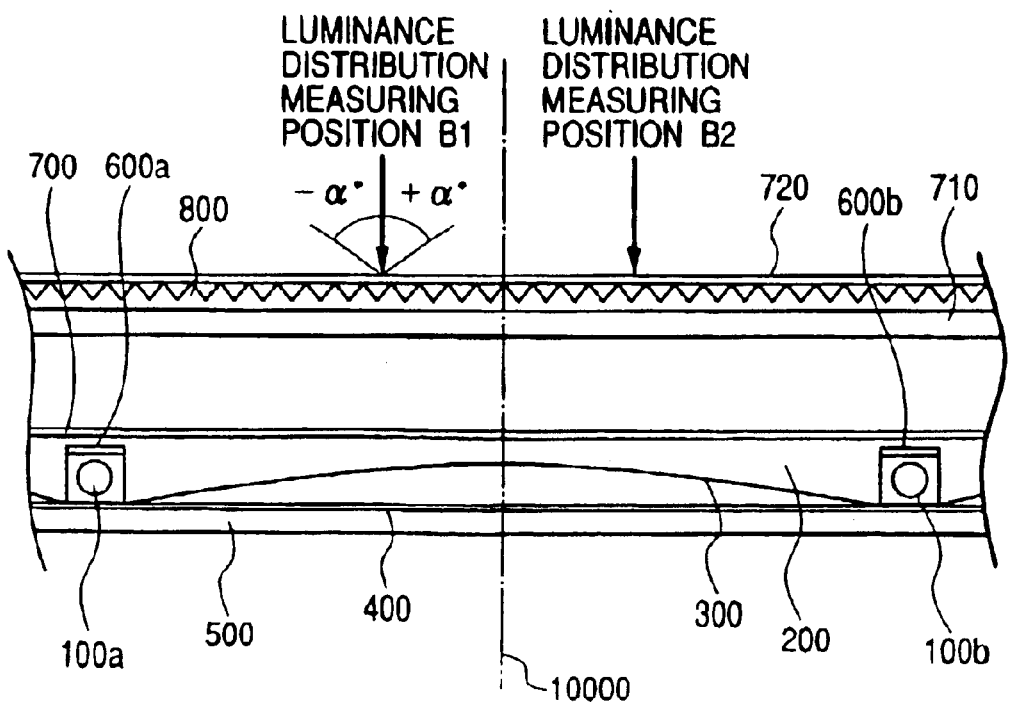
FIG. 6 is a partly cross-sectional schematic block diagram of still another lighting unit based on the present invention.
Figure 7:
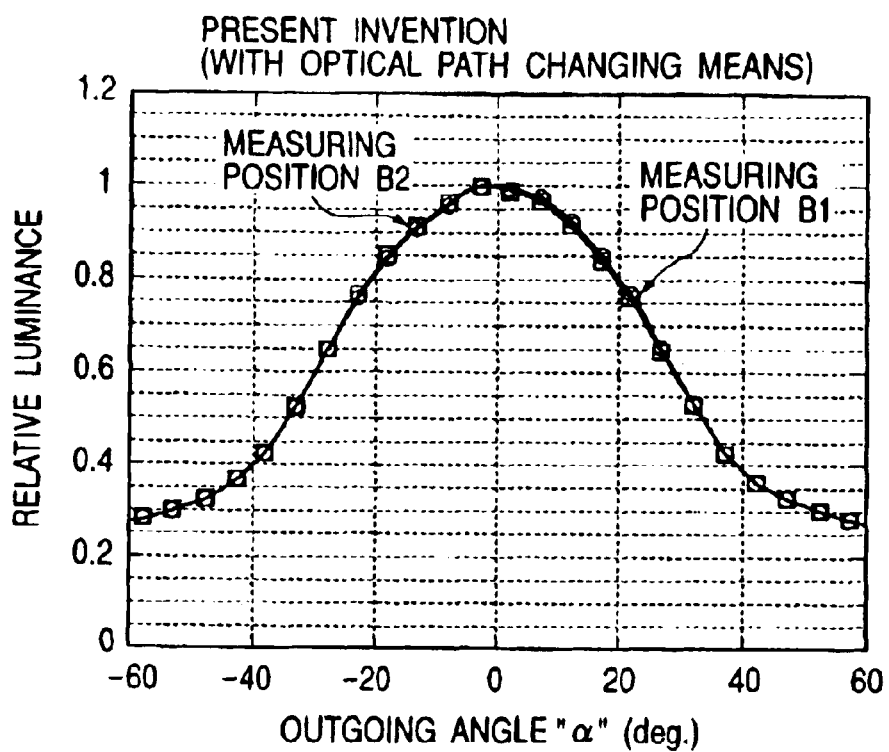
FIG. 7 is a graph showing the relationship between the outgoing angle and luminance of light in a lighting unit based on the present invention.
Figure 8:
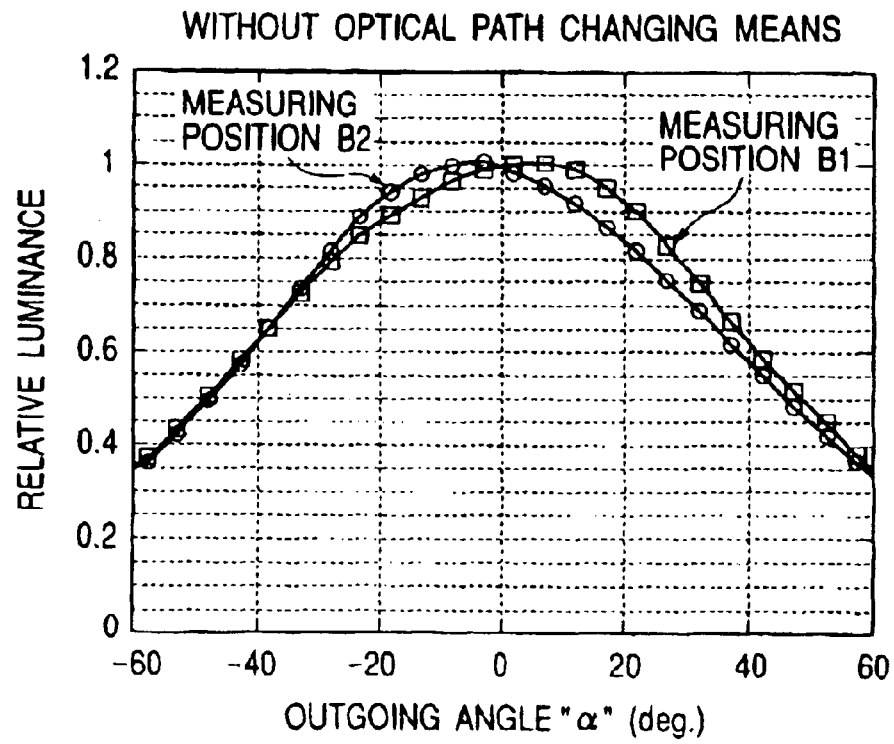
FIG. 8 is a graph showing the relationship between the outgoing angle and luminance of light in the lighting unit shown as an example for comparison.

FIGS. 7 and 8 are graphs explaining the effectiveness of the present invention in detail. In FIGS. 7 and 8, the horizontal axis denotes changes in the traveling direction of light, namely, changes in the outgoing angle of the light radiated from the lighting unit, and the vertical axis denotes changes in the relative luminance value normalized using its equivalent value with respect to an outgoing angle of 0 degrees. FIG. 6 is an explanatory diagram of luminance measuring positions, and luminance was measured at positions B1 and B2 shown in FIG. 6. Both positions B1 and B2 are 10 mm away from the thinnest portion 10000 of the light-guiding plate 200, and angles were measured with respect to the angles of depression (+α and −α) in a direction orthogonal to the longitudinal direction of the light source. These measurements are described below using FIGS. 7 and 8.

Measurement results that were obtained in the lighting unit pertaining to embodiment 1 are shown in FIG. 7. Although other measurement results that were obtained in the lighting unit pertaining to embodiment 1 are also shown in FIG. 7, the measurement results in this case were obtained without optical path changing means 800 in the lighting unit. In FIG. 8, the uniformity of light is improved by the presence of light-guiding plates, light diffusion means, and other components. However, since an optical path changing means is not provided, the relationship between the outgoing angle of light and the distribution of luminance differs according to the particular measuring position. That is to say, the outgoing angle of light that enables the maximum luminance to be obtained deviates from the front direction (0 degrees in outgoing angle), and this means that when images are viewed from a diagonal direction, the nonuniformity of luminance occurs. For the lighting unit in FIG. 7 of the present invention, however, the outgoing angles of light and the distribution of luminance are in agreement, regardless of the measuring position, and this means that even when images are viewed from a diagonal direction, the nonuniformity of luminance does not occur. In other words, a problem associated with the use of a lighting unit of the hybrid scheme, namely, the occurrence of the nonuniformity in luminance during viewing from a diagonal direction, can be prevented without significant decreases in the luminance itself, by using an optical path changing means. When the above-mentioned member was used as optical path changing means 800, luminance in the front direction (0 degrees in outgoing angle) was about 1.3 times that which was measured without using optical path changing means 800. This means that since optical path changing means 800 is used, the lighting unit of the present invention is effective for preventing the occurrence of the nonuniformity in luminance during viewing from a diagonal direction, and for improving luminance. In this embodiment, one transparent sheet having a flat and smooth surface at one side of light-guiding plate 200 and a corrugated surface at the other side, is used as the optical path changing means. Also, optical path changing means 800 efficiently functions since the principal traveling direction of the light entering the optical path changing means is adjusted to angles from 10 to 30 degrees by the light diffusion means provided between light-guiding plate 200 and the optical path changing means. The optical path changing means can also be made of a transparent sheet having a corrugated surface at one side of light-guiding plate 200 and a flat and smooth surface at the other side, instead of the corresponding material in embodiment 1. In that case, it is preferable that, without providing a light diffusion means between light-guiding plate 200 and the optical path changing means, the apex angle of the prism forming the corrugated surface should be determined according to the particular principal traveling direction of the light leaving the light-guiding plate, or that the apex angle of the prism forming the corrugated surface should be made to differ in-plane in order to implement the maximum achievable function.

The effectiveness of the light diffusion means pertaining to the lighting unit of the present invention is also described in detail below. In general, the uniformity in the in-plane distribution of luminance in a lighting unit can be improved by enhancing the light diffusion performance (Hayes value, for example) of each light diffusion means to be located on a light source or light-guiding plate, or by increasing the distance between the light source or the light-guiding plate and the light diffusion means. However, the former method reduces the transmittance of the light diffusion means and, hence, the luminance of the lighting unit, and the latter method increases the thickness of the entire lighting unit. For these reasons, we have performed energetic studies to find that separating into at least two layers the light diffusion means to be provided on the light source or the light-guiding plate, then positioning one of the two layers on the light source, and positioning the other layer with a fixed clearance with respect to the layer positioned on the light source enables the in-plane distribution of luminance to be made more uniform than by continuously arranging a plurality of light diffusion means of the same performance in laminated form.

Figure 9:
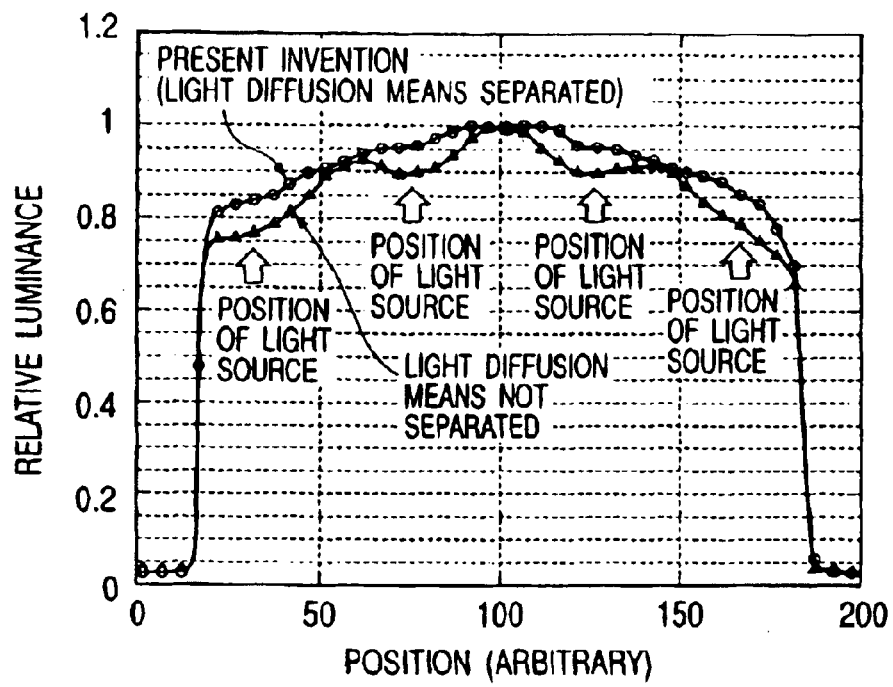
FIG. 9 is a graph showing the distribution of the luminance of light in a lighting unit based on the present invention.

FIG. 9 is a graph representing the distribution of luminance in the lighting unit shown in embodiment 1. The luminance values at the positions within section A–A' in FIG. 1 are shown in this graph, with its horizontal axis denoting the positions and its vertical axis denoting the relative luminance that was obtained by normalizing the luminance values of each position by the luminance value at the central position. In FIG. 9, the laminated arrangement of the first light diffusion means and the second light diffusion means at a distance (S1) of 9 mm from light-guiding plate 200 is also shown as an example for comparison purposes.

It can be seen that as obvious from FIG. 9, for the lighting unit of the present invention, separating into at least two layers the light diffusion means to be provided on the light source or the light-guiding plate, then positioning one of the two layers on the light source, and positioning the other layer with a fixed clearance with respect to the layer positioned on the light source enables the in-plane distribution of luminance to be made more uniform than by continuously arranging a plurality of light diffusion means of the same performance in laminated form. Accordingly, this configuration is effective in that given the same thickness, it is possible to construct a lighting unit more uniform in terms of in-plane luminance distribution, and in that given the same uniformity of in-plane luminance distribution, a thinner lighting unit can be constructed. An increase in clearance S1 of the separated light diffusion means gives a greater effect with respect the uniformity of luminance distribution. This effect also depends on the structure of the light source and light-guiding plate, and therefore cannot be univocally determined. If the clearance is 2 mm or more, however, an obvious effect can be obtained. In the view of the structure of the lighting unit and its reduction in thickness, therefore, it is desirable that clearance S1 be set to fall within the range from 2 to 10 mm.

Next, the effectiveness of the shape of the light-guiding plate is described in detail below using FIG. 10.

The horizontal axis denotes the rate of "h2" to "h1", where the height of the plane of incidence on the light-guiding plate is represented as "h2", namely, the height of the side face directly close to one light source on the light-guiding plate (in embodiment 1, the height of the grooved side is shown as "h2"), and the height from the side of the light-guiding plate directly close to the corresponding light source, namely, the bottom end of the light-guiding plate at the side of the light source accommodation groove of the light-guiding plate shown in embodiment 1, to the reverse side of the thinnest portion of the light-guiding plate is represented as "h1". The vertical axis denotes the relative luminance that was obtained by dividing the luminance value of the lighting unit by the luminance value corresponding to the case of "h1/h2=0". The fact that the value of "h1/h2" is 0 means that the thickness of the light-guiding plate between light sources is constant, and this, in turn, means that the light-guiding plate has a shape of a flat plate and that as the value of "h1/h2" increases, the thinnest portion 10000 of the light-guiding plate decreases in thickness. The symbol "o" in FIG. 10 denotes measured data relating to the lighting unit of the present invention, and the data is plotted not only for the case of "h1/h2=0.75" in embodiment 1, but also for the case that the reverse side of the light-guiding plate is a curved surface 135.9 mm in radius R ("h1/h2=0.75") and for the case that the reverse side is a curved surface 102.8 mm in radius R ("h1/h2=1.0"). In addition, data that was obtained when the angle-of-inclination (θ) of the reverse side of the light-guiding plate was constant, is also plotted with the symbol "Δ". In this graph, the fact that θ is constant applies when as shown in, for example, FIG. 12, the angle-of-inclination (θ) of the reverse side 202k of the light-guiding plate 200k is constant over the entire area from the grooved portion of the light-guiding plate to its thinnest portion 10000k. That is to say, the above applies when the cross section of the light-guiding plate has a shape of connected wedge-type plate-like members.

When a cold cathode fluorescent lamp is used as the light source, the efficiency of incidence of the light from the light source to the light-guiding plate increases as the plane of incidence increases in height. It is desirable, therefore, that "h2", the height of the plane of incidence, should be as great as possible. An increase in "h2", however, also increases the thickness of the light-guiding plate and, hence, the thickness of the entire lighting unit. In view of the trade-off between the efficiency of incidence of the light from the light source to the light-guiding plate and reduction in the thickness of the unit, the ideal height of the plane of incidence would be between 1.5 and 2.0 times the diameter of the lamp. With this in mind, as described above for embodiment 1, "h2", the height of the plane of incidence, is set to 4.0 mm for a cold cathode fluorescent lamp 2.6 mm in diameter.

Figure 10:
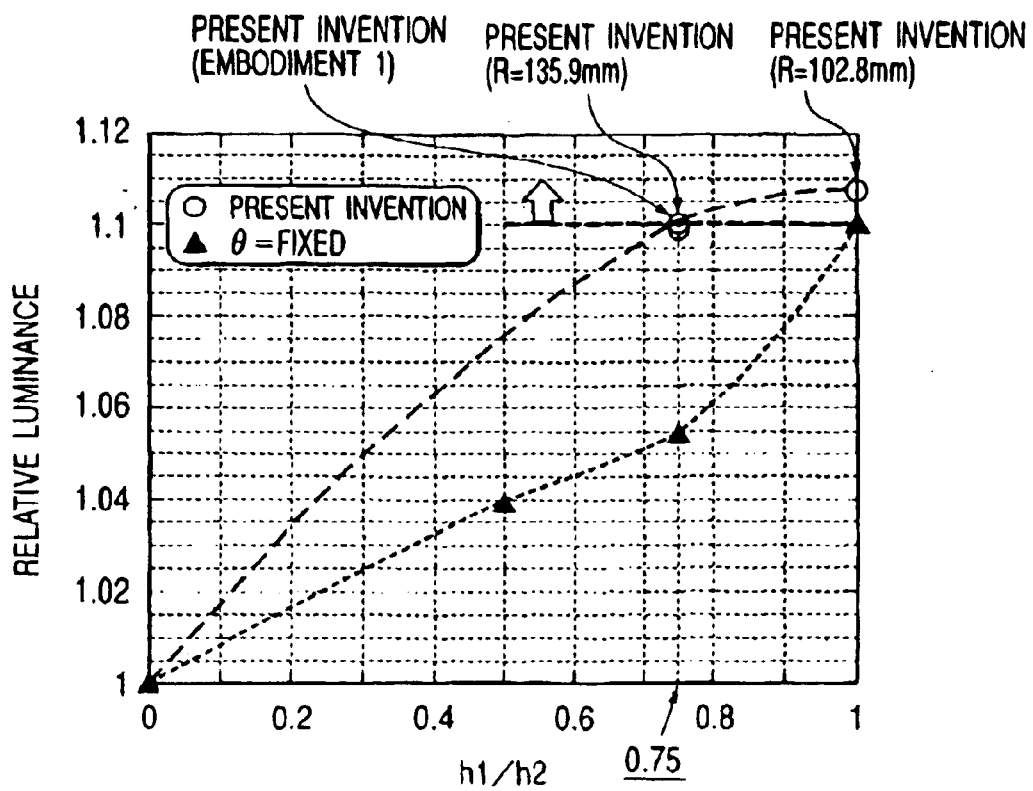
FIG. 10 is a graph showing the relationship between the shape of the light-guiding plate, and the luminance of light, in a lighting unit based on the present invention.

As obvious from FIG. 10, an increase in "h1/h2" improves luminance, irrespective of the shape of the reverse side 202 of the light-guiding plate. In terms of luminance improvement, therefore, it is desirable that "h1/h2" be as great as possible. However, a decrease in "h2", the height of the plane of incidence, reduces the efficiency of incidence of the light from the light source to the light-guiding plate as described above. To increase the value of "h1/h2", therefore, it is important to increase height "h1" at the thinnest portion of the reverse side 202 of the light-guiding plate. Increasing height "h1" means increasing both the thickness of the thinnest portion of the light-guiding plate and the average angle of inclination of the reverse side 202 thereof. As the reverse side of the light-guiding plate is increased in the angle of inclination, light that has entered the light-guiding plate can leave the surface thereof more easily. Also, when the light-guiding plate has thin portions, light that has entered the light-guiding plate cannot easily pass through the thin portions. Accordingly, if height "h1" is increased, light that has entered the light-guiding plate can be sent to the surface 201 thereof more efficiently before the light passes through the thinnest portion 10000 of the light-guiding plate. This means that the amount of light leaking to adjacent light sources decreases and thus that the amount of light which cannot be utilized as lamp light for reasons such as absorption or dissipation by the adjacent light sources is reduced for improved luminance. For a high-luminance lighting unit intended to create a luminance of at least 5,000 cd/m² under the present invention, since light sources are arranged at short pitches of several tens of millimeters, light leakage to adjacent light sources is prone to occur, and suppressing such light leakage is very important to enhancing the utilization efficiency of the outgoing light from the light sources as lamp light.

As set forth earlier, in general, a decrease in the thickness of the cross section of a light-guiding plate according to the particular distance from the light sources, that is to say, an increase in the value of "h1/h2" above 0 makes the principal traveling direction of the outgoing light from the light-guiding plate suddenly changes at the boundary between the thinnest portion thereof and the immediate top of the light sources. If no appropriate measures are taken, therefore, repeated alternation in contrast, namely, the nonuniformity of luminance will be observed when the lighting unit is viewed from a diagonal direction. For the lighting unit of embodiment 1, however, as described above, since the different traveling directions of the outgoing light from the light-guiding plate are corrected by an optical path changing means, the nonuniformity of luminance can be prevented from occurring during the observation of images from a diagonal direction. In short, the lighting unit pertaining to the present invention is effective in that, since even an increase in the value of "h1/h2" for improved luminance enables the nonuniformity of luminance to be prevented from occurring during the observation of images from a diagonal direction, the flexibility of shape design for the light-guiding plate is extended and a configuration higher in luminance can be adopted.

Also, the present invention is characterized in that in order to minimize light leakage to adjacent light sources, not only the value of "h1/h2" is specified to be great, but also the relationship between θn1, which is the angle of inclination of a portion relatively close to the light sources, and θf1, which is the angle of inclination of a portion far from the light sources, is specified to be "θn1≧θf1", and in that the angle of inclination at the thinnest portion of the light-guiding plate is essentially 0 degrees. As shown in FIG. 10, this configuration enables the lighting unit of the present invention to give higher luminance than in the case that θ, the angle of inclination of the reverse side of the light-guiding plate, is constant, even when the value of "h1/h2" is the same. This is because the light entering the light-guiding plate can be more actively radiated from portions close to the light sources by increasing the angle of inclination of these close portions, that is to say, because, since the light entering the light-guiding plate can be radiated from the surface of the light-guiding plate at a shorter distance, the resulting decreases in the amount of light leaking to adjacent light sources minimize the loss of the light, even if the light sources are arranged at short pitches. The conventional lighting units of the edge-light scheme have the structure that keeps light near the light sources from leaving the light-guiding plate so as to propagate the light to the rearmost possible portion thereof. In this sense, the structure of the lighting unit pertaining to the present invention is in contrast to, and is characterized over, the existing lighting units.

As described above, a greater "h1/h2" value gives higher luminance. However, to satisfy the requirement that the thickness of the light-guiding plate should be minimized to implement more thin lighting unit design, it is desirable that the height of the plane of incidence on the light-guiding plate and the height of the thinnest portion on the reverse side thereof should be the same, that is to say, that an actual "h1/h2" value should be limited to 1.0. At this time, for the lighting unit pertaining to the present invention, as is obvious from FIG. 10, while "h1/h2" is equal to or greater than 0.75, it is possible to obtain luminance higher than its maximum value achievable when θ, the angle of inclination on the reverse side of the light-guiding plate, is constant. With the lighting unit of the present invention, therefore, it is possible to achieve higher luminance than before, by setting "h1/h2≧0.75". It is therefore desirable that the lighting unit be structurally satisfy this requirement.

As described above, the present invention is characterized in that the cross section of the reverse side 202 of the light-guiding plate is specified to satisfy the relationship of "θn1≧θf1" (θn1: the angle of inclination near the light sources, θf1: the angle of inclination of a portion far from the light sources), and in that the angle of inclination at the thinnest portion of the light-guiding plate is essentially 0 degrees. Under the structure of this lighting unit, the light entering the light-guiding plate can be more actively radiated from portions close to the light sources and the amount of light leaking to adjacent light sources can be minimized. Such structure, therefore, is very effective for not only improving luminance, but also making the in-plane distribution of luminance uniform. Also, the minimization of the angle of inclination to essentially 0 degrees is particularly effective for suppressing the occurrence of luminescent lines due to the presence of discontinuous portions.

Figure 11:
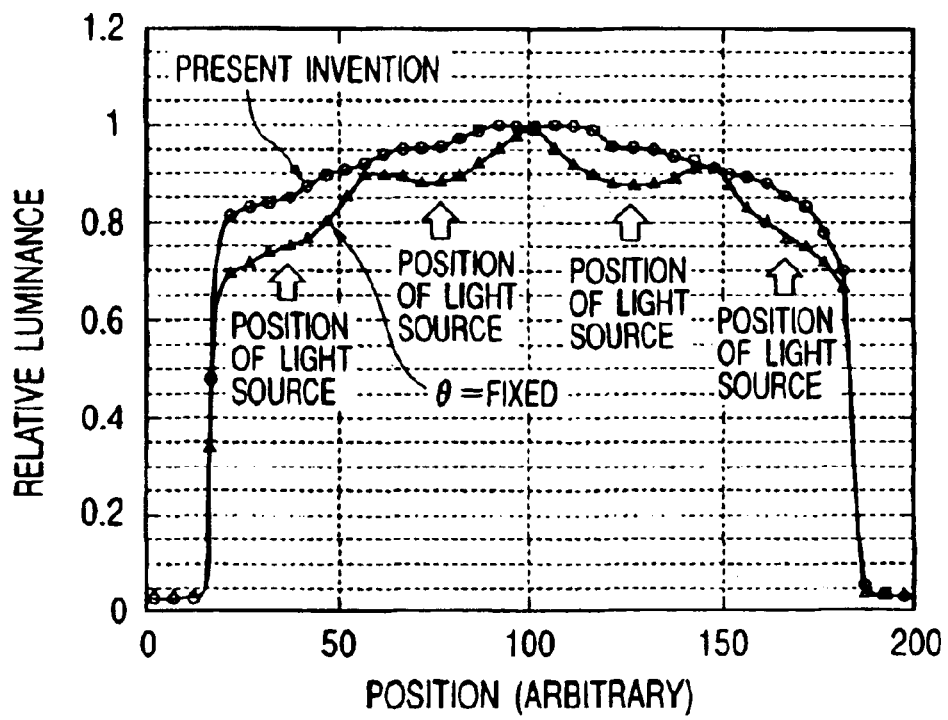
FIG. 11 is a graph showing the distribution of the luminance of light in another lighting unit based on the present invention.

FIG. 11 is a graph explaining the effectiveness of the lighting unit pertaining to the present invention. This figure is a graph showing the luminance distribution of the lighting unit in embodiment 1, and the distribution relates to the luminance at section A–A' in FIG. 1. The horizontal axis denotes positions, and the vertical axis denotes the relative luminance that was obtained by normalizing the luminance values of each position by the luminance value at the central position. Data that was obtained when only the angle of inclination, θ, on the reverse side of the light-guiding plate was fixed (all other parameters were the same as those of embodiment 1), is also shown as an example for comparison purposes.

Figure 12:
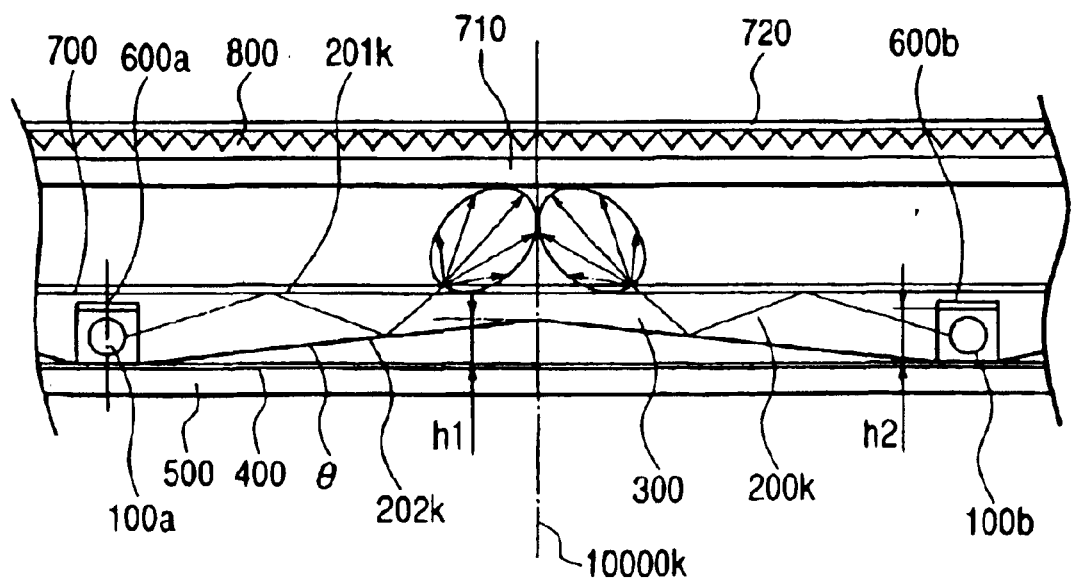
FIG. 12 is a partly cross-sectional schematic block diagram of still another lighting unit based on the present invention.

As obvious from FIG. 11, for the lighting unit pertaining to the present invention, it is possible to obtain a uniform distribution of luminance, compared with the case that the angle of inclination, θ, on the reverse side of the light-guiding plate is fixed. When the angle of inclination, θ, on the reverse side of the light-guiding plate is fixed, the shape of the reverse side thereof changes discontinuously at the thinnest portion 10000$k$, as shown in FIG. 12. If the reverse side of the light-guiding plate is discontinuous in shape, the distribution of luminance will significantly change there and this may cause luminescent lines to occur. In addition, when light that has been radiated from adjacent light sources (in FIG. 12, 100$a$ and 100$b$) leaves the light-guiding plate, the light will overlap at the top of the thinnest portion 10000$k$ of the light-guiding plate and the luminance at this portion will increase, with the result that the uniformity in the in-plane distribution of luminance will decrease. For the lighting unit pertaining to the present invention, however, the angle of inclination of the reverse side of the light-guiding plate is continuously reduced with increases in the distance from the light sources so that the angle of inclination at the thinnest portion 10000$k$ of the light-guiding plate will be 0 degrees. For this reason, there will occur no discontinuous portions that cause the occurrence of luminescent lines.

Furthermore, since the lighting unit pertaining to the present invention is constructed so that light is radiated from the light sources more actively, the overlapping of the light-guiding plate leaving light on the thinnest portion of the light-guiding plate is reduced and as a result, a uniform luminance in-plane distribution can be obtained.

The uniformity in the in-plane distribution of luminance can be improved by increasing the distance between the light-guiding plate and the light diffusion means, namely, by making the lighting unit thinner. In other words, improvement of the uniformity in the in-plane distribution of luminance enables a thinner lighting unit to be obtained. In embodiment 1, the shape of the reverse side of the light-guiding plate improves the uniformity in the in-plane distribution of luminance, with the result that the distance between the light-guiding plate and the light diffusion means can be reduced and a thinner lighting unit can be constructed.

That is to say, the lighting unit of the present invention is effective in that both luminance and the uniformity in the in-plane distribution of luminance, namely, improvement in the luminance and thickness of the lighting unit can be achieved at the same time by constructing the cross section of the reverse side of the light-guiding plate as set forth above.

For lighting unit of the present invention, when the tube current of each cold cathode fluorescent lamp (light source) is 6 mA, the front luminance in the center area of the unit is 5,200 cd/m$^2$. This is a level at which a display luminance of 400 cd/m$^2$ can be obtained by using an LCD panel 8% or more in transmittance, and this level is exactly where the construction of TV-use LCD equipment for representing dynamic images can be implemented.

(Embodiment 2)

Figure 14:
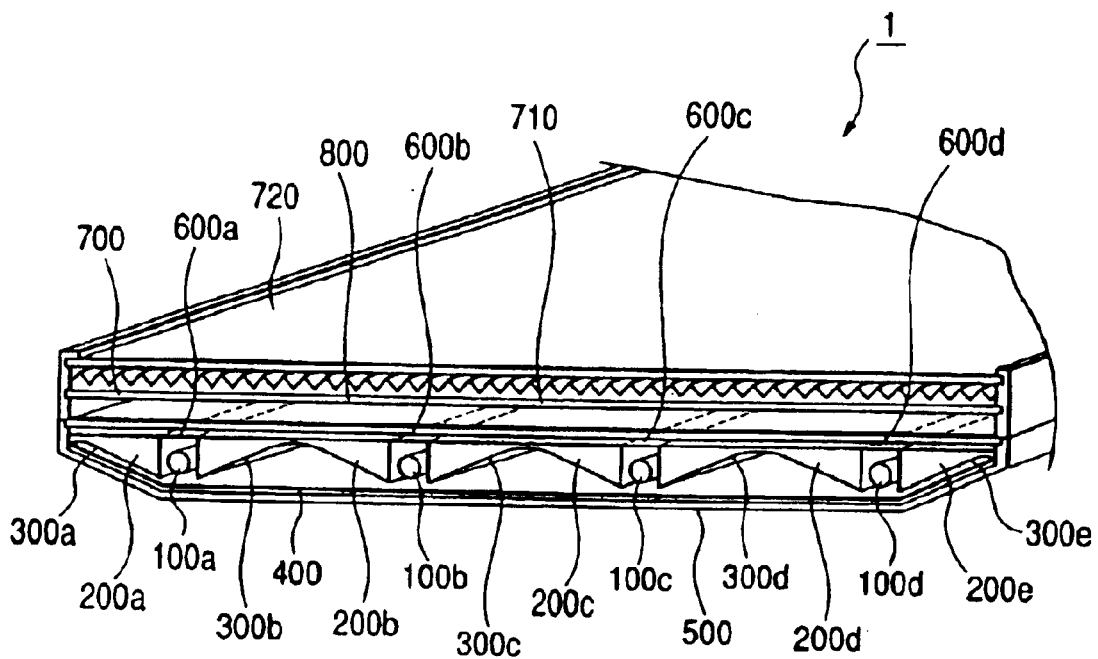
FIG. 14 is a partly cross-sectional schematic diagonal view showing a lighting unit based on the present invention.
Figure 15:
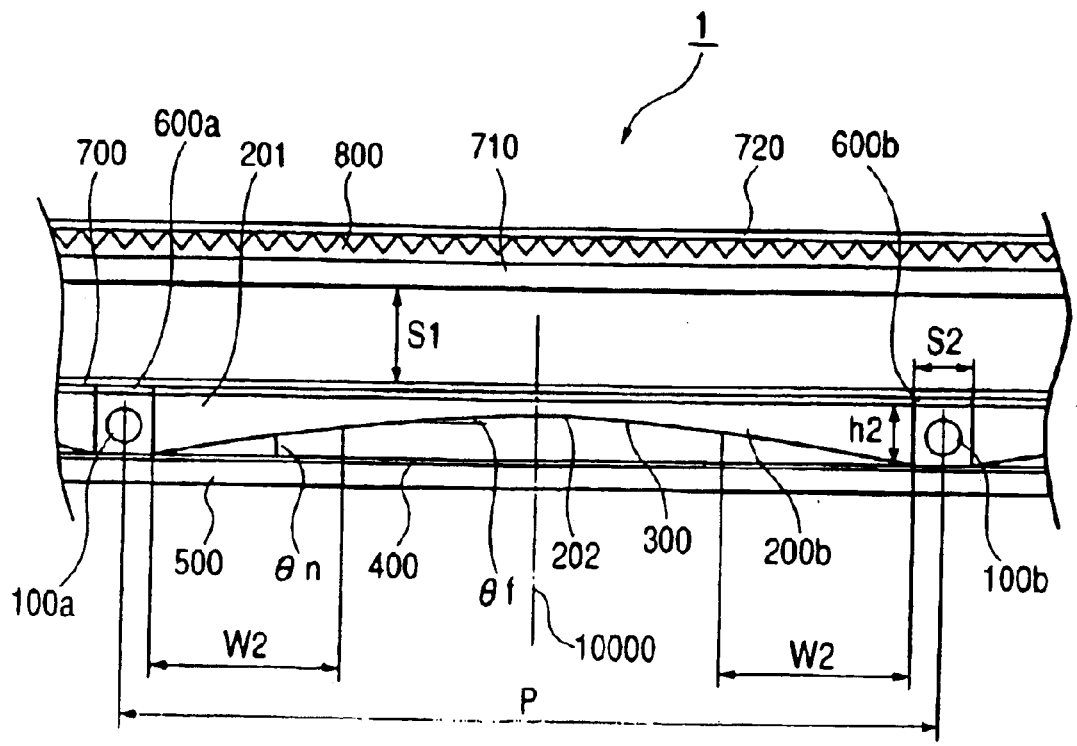
FIG. 15 is a partly cross-sectional schematic block diagram of a lighting unit based on the present invention.
Figure 16:
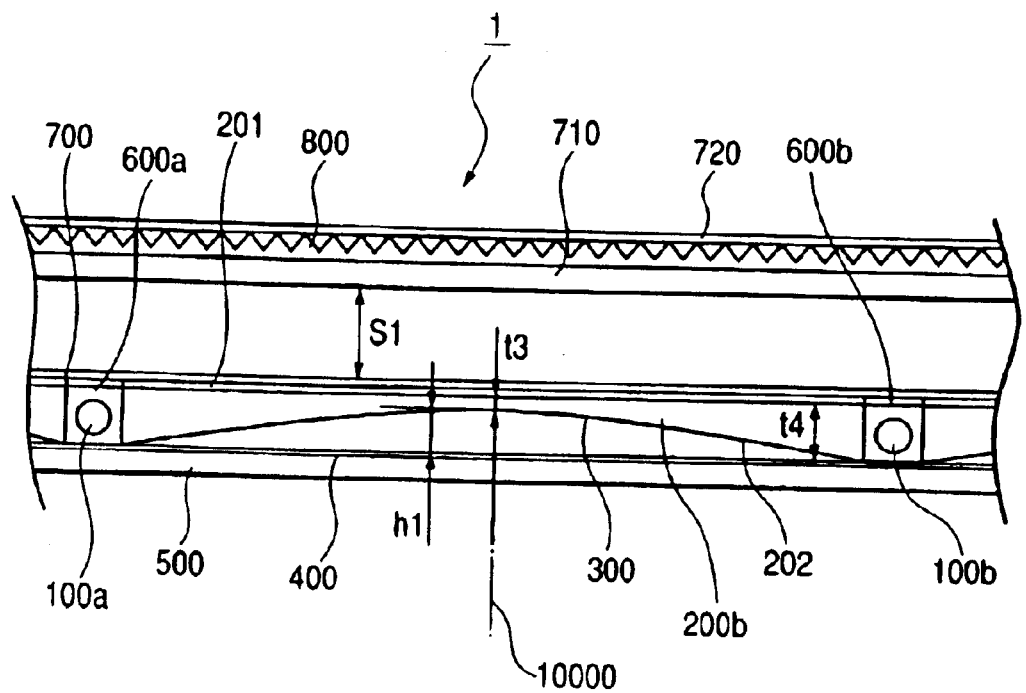
FIG. 16 is a partly cross-sectional schematic block diagram of another lighting unit based on the present invention.

Another embodiment of the lighting unit pertaining to the present invention is described using FIGS. 14 to 16.

FIG. 14 is a partly cross-sectional schematic diagonal view showing another example of a lighting unit based on the present invention. FIGS. 15 and 16 are partly cross-sectional schematic views of the lighting unit.

In embodiment 2, monoblock light-guiding plate 200 in the lighting unit described for embodiment 1 is separated and a plurality of semi-transmitting reflection means 600 (600$a$ to 600$d$) are supported by the first light diffusion means 700. The identical portions to those of embodiment 1 are each assigned the same call-out numeral, and their detailed description is omitted.

The light-guiding plate in embodiment 2 is the same as light-guiding plate 200 (in embodiment 1) when it is reduced by 1 mm in surface thickness and separated into five portions. Therefore, the maximum thickness "t4" of light-guiding plates 200$a$ to 200$e$ and the thickness "t3" of the thinnest portion 10000 are 4.0 mm and 1.0 mm, respectively, and clearance S2 between adjacent light-guiding plates is 4.6 mm. The reverse side of each light-guiding plate has the same shape as in embodiment 1.

In embodiment 2, therefore, the shape of the light-guiding plate satisfies the requirements described below. More specifically, the value of "h1/h2", where "h1" is the height from the end of the reverse side of the light-guiding plate at one side of the light source located next to one light-guiding plate to the reverse side of the light-guiding plate at the thinnest portion 10000 of light-guiding plates 200$a$ and 200$b$, and "h2" is the height of the plane of incidence on the light-guiding plate (namely, in embodiment 2, the height "h2" of the side next to the light sources of light-guiding plates 200$a$ and 200$b$), satisfies the relationship of "h1/h2≧0.75" (see FIGS. 15 and 16). Also, the angle of inclination of the reverse side of light-guiding plates 200a and 200e each, namely, the angle of the reverse side 202 of each light-guiding plate with respect to a plane horizontal to the surface 201 of the light-guiding plate, is continuously reduced with increases in the distance from the light source so that the angle of inclination at the thinnest portion 10000 of the light-guiding plate will be 0 degrees. In other words, when the angle of inclination of a portion relatively near the light source is taken as θn1 and the angle of inclination at a portion far from the light source is taken as θf1, the requirement of "θn1≧θf1" is satisfied.

Although, in embodiment 1, semi-transmitting reflection means 600 is located directly above the light sources in the grooves of light-guiding plate 200, no light-guiding plates exist at this portion in embodiment 2. Semi-transmitting reflection means 600 should therefore be supported using the first light diffusion means 700. In embodiment 2, semi-transmitting reflection means 600 uses a white pigment printed on the diffusion sheet that functions as the first light diffusion means 700. The white pigment directly above the light sources was printed thickly and without a clearance, and as the distance from the immediate top of the light sources increased, the printing area of the white pigment for shielding was continuously reduced.

Semi-transmitting reflection means 600 can likewise be constructed by attaching to light diffusion means 700 a film or sheet functioning as a slot-shaped semi-transmitting reflection means of the same width as the clearance S2 between adjacent light-guiding plates, instead of using a white pigment.

Also, semi-transmitting reflection means 600 can likewise be supported by using a transparent sheet, a transparent plate, or the like, arranged on the light-guiding plate, instead of using the first light diffusion 700.

As with embodiment 1, embodiment 2 is effective in that the cross-sectional shape of the reverse side of each light-guiding plate (light-guiding plates 200a to 200e) improves both luminance and the uniformity in the in-plane distribution of luminance, that is to say, enables luminance improvement and thickness reduction of the lighting unit to be achieved at the same time. Embodiment 2 is also effective in that one of major problems associated with the lighting units of the hybrid scheme, namely, the occurrence of the non-uniformity of luminance during the observation of images from a diagonal direction, can be prevented by using optical path changing means 800, and in that the luminance itself can be improved. In addition, embodiment 2 is effective in that it is possible to improve the uniformity in the in-plane distribution of luminance and thus reduce the thickness of the lighting unit by separating the light diffusion means into two layers, positioning one of the two layers on the light-guiding plate, and positioning the other layer with a fixed clearance with respect to the layer on the light-guiding plate.

If, as in the lighting unit pertaining to embodiment 1, the light-guiding plate is a monoblock molding, the thickness of the light-guiding plate is greater than the height of the plane of incidence. If the light-guiding plate is separated as in embodiment 2, however, the thickness of the light-guiding plate and the height of the plane of incidence can be matched. Therefore, when the height of the plane of incidence is set to the same value as that shown in embodiment 1, since the light-guiding plate in embodiment 2 is thinner, a thinner lighting unit can be constructed.

When the thickness of the light-guiding plate is the same as the height of the plane of incidence, since the plane of incidence can be increased in height by separating the light-guiding plate, light can be radiated from the light sources to the light-guiding plate more efficiently. As a result, a lighting unit higher in luminance can be constructed.

(Embodiment 3)

Still another embodiment of the lighting unit pertaining to the present invention is described below.

Figure 17:
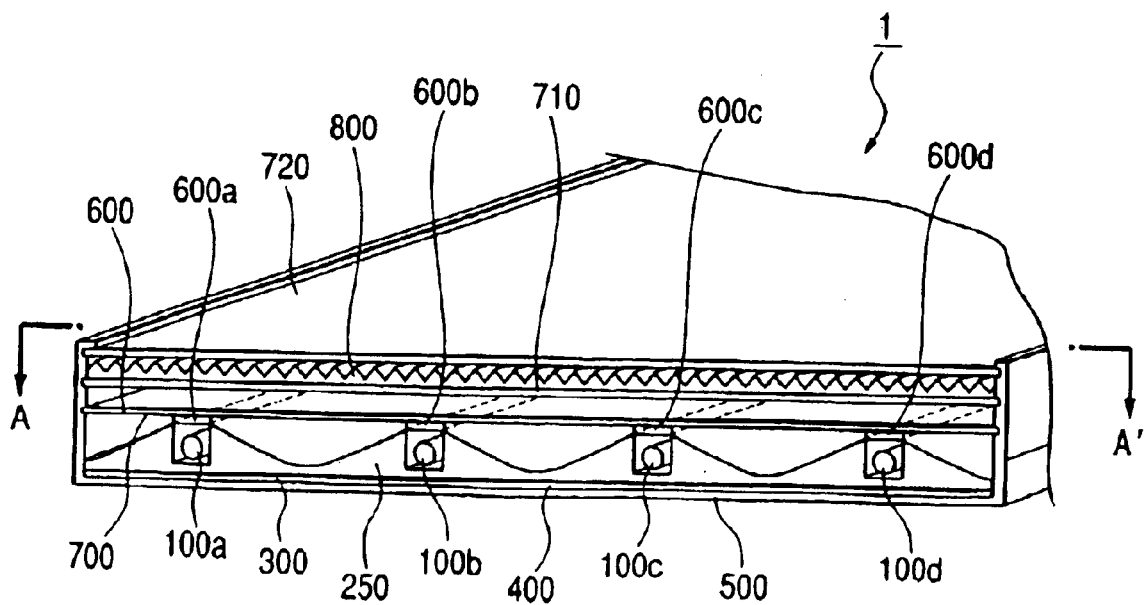
FIG. 17 is a partly cross-sectional schematic diagonal view showing a lighting unit based on the present invention.
Figure 18:
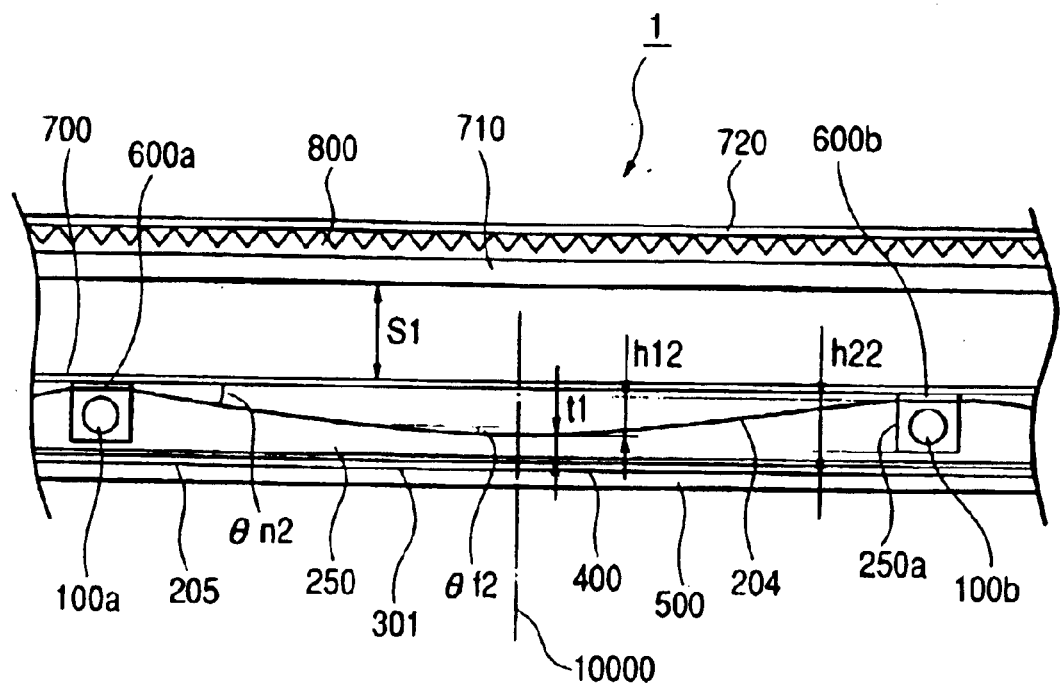
FIG. 18 is a partly cross-sectional schematic block diagram of another lighting unit based on the present invention.

FIG. 17 is a partly cross-sectional schematic diagonal view that shows another example of a lighting unit based on the present invention. FIG. 18 is a partly cross-sectional schematic view of the lighting unit.

In embodiment 3, the light-guiding plate is mounted upside down with respect to the light-guiding plate in the lighting unit described for embodiment 1, and a plurality of semi-transmitting reflection means 600 (600a to 600d) are supported by the first light diffusion means 700. The identical portions to those of embodiment 1 are each assigned the same call-out numeral.

As mentioned above, the lighting unit in embodiment 3 has light-guiding plate 200 mounted upside down. The surface 204 of the light-guiding plate 250 is such an inclined face including a curved surface that decreases in cross-sectional thickness with increases in the distance from the light sources, and the reverse side 205 of the light-guiding plate 250 is flat. Although, in embodiment 1, a description was made that the light-guiding plate has a flat surface and an inclined reverse, the lighting unit of the present invention is not limited by such shape of the light-guiding plate. That is to say, similar functions and effects can be obtained by using a light-guiding plate whose surface is inclined and whose reverse is flat.

In this case, the shape of the light-guiding plate is specified as follows. That is to say, when the height of the side of each light source accommodation groove in light-guiding plate 250, namely, the height of the plane of incidence (in the figure, 250a) is taken as "h22" and the height from the end of the surface side of the light-guiding plate at the side of the light source accommodation groove in light-guiding plate 250 to the surface of the thinnest portion thereof is taken as "h12", "h12/h22" should be 0.75 or more. Also, the angle of inclination of the surface 204 of the light-guiding plate 250, namely, the angle of the surface 204 of the light-guiding plate with respect to a plane horizontal to the reverse side 205 of the light-guiding plate, should be continuously reduced with increases in the distance from the light source so that the angle of inclination at the thinnest portion 10000 of the light-guiding plate will be 0 degrees. In this case, however, the surface of the light-guiding plate can have areas equal in the angle of inclination. In other words, when the angle of inclination at such a portion on the surface of the light-guiding plate that is relatively near the light source is taken as θn2 and the angle of inclination at a portion far from the light source is taken as θf2, the requirement of "θn2≧θf2" should be satisfied.

Since the light-guiding plate in embodiment 3 takes an inverted form with respect to the light-guiding plate in embodiment 1, the above-mentioned requirements of "h1/h2=0.75" and "θn2≧θf2" are satisfied.

Light diffusion means 301 is formed on the reverse side 205 of the light-guiding plate 250. Light diffusion means 301 also has the same function as the light diffusion means 300 of embodiment 2 described above. That is to say, light diffusion means 301 changes the angle of reflection of the light propagated through the light-guiding plate 250 and thus increases the amount of light radiated from the surface 204 of the light-guiding plate.

Although, in embodiment 1, semi-transmitting reflection means 600 is located directly above the light sources in the grooves of light-guiding plate 200, no light-guiding plates exist at this portion in embodiment 3. Semi-transmitting reflection means 600 should therefore be supported using the first light diffusion means 700. In this case, as in embodiment 2, semi-transmitting reflection means 600 can use a white pigment printed on the first light diffusion means 700. Also, semi-transmitting reflection means 600 can likewise be constructed by attaching to the first light diffusion means 700 a film or sheet functioning as a slot-shaped semi-transmitting reflection means of the same width as that of the grooves in the light-guiding plate, instead of using a white pigment. In addition, semi-transmitting reflection means 600 can likewise be supported by using a transparent sheet, a transparent plate, or the like, arranged on the light-guiding plate, instead of using the first light diffusion 700.

Light diffuse reflection means 301 is provided on the reverse side 205 of the light-guiding plate 250. Light diffuse reflection means 301 can be constructed either by patterning a light diffusion means with a substance (such as white pigment ink) on the reverse side of the light-guiding plate or by forming on the reverse side of the light-guiding plate a light diffusion means that consists of a great number of very small undulations or stepped portions including an inclined surface, and then providing the back of this light diffusion means with a reflection sheet having a plane-of-reflection formed on its supporting substrate such as a high polymer film. Or the entire reverse side of the light-guiding plate can have a reflection sheet directly attached using a transparent adhesive.

As with embodiment 2, embodiment 3 is effective in that the shape of the light-guiding plate improves both luminance and the uniformity in the in-plane distribution of luminance, that is to say, enables luminance improvement and thickness reduction of the lighting unit to be achieved at the same time. Embodiment 3 is also effective in that one of major problems associated with the lighting units of the hybrid scheme, namely, the occurrence of the nonuniformity of luminance during the observation of images from a diagonal direction, can be prevented by using optical path changing means 800, and in that the luminance itself can be improved. In addition, embodiment 3 is effective in that it is possible to improve the uniformity in the in-plane distribution of luminance and thus reduce the thickness of the lighting unit by separating the light diffusion means into two layers, positioning one of the two layers on the light-guiding plate, and positioning the other layer with a fixed clearance with respect to the layer on the light-guiding plate.

In embodiment 3, since the reverse side 205 of the light-guiding plate 250 is a flat face, a light diffuse reflection means can be formed more easily than in the case that the reverse side is an inclined face as in embodiment 2, by pattern-printing with a white pigment or attaching a reflection sheet.

Also, since the surface 204 of the light-guiding plate 250 is recessed, the distance between the surface 204 of the light-guiding plate and other components (such as the first light diffusion means 700) arranged on surface 204 can be increased without increasing the thickness of the entire lighting unit 1. In general, as the distance between the light-guiding plate and the light diffusion means is increased, the uniformity in the in-plane distribution of luminance improves. Therefore, the fact that the distance between the light-guiding plate and the light diffusion means can be increased without increasing the thickness of the entire lighting unit means that given the same thickness of lighting units, more uniform in-plane distributions of luminance can be obtained. Also, given the same uniformity in the in-plane distribution of luminance, thinner lighting units can be achieved.

(Embodiment 4)

In embodiments 1 to 3 of the present invention, the lighting unit uses transparent resin as its light-guiding plate material. In view of the main purport of the present invention, however, the material that can be used for the light-guiding plate pertaining to the invention is not limited to transparent resin only.

One of the important factors in the lighting units of the present invention enables the loss of light to be reduced, and higher luminance to be achieved, by minimizing light leakage to adjacent light sources. More specifically, it is possible to construct the unit so that after light has entered the light-guiding plate, the light leaves it efficiently at the shortest possible distance, and to reduce the amount of light leaking to adjacent light sources. Therefore, a light-guiding plate consisting of transparent resin and light-transmitting fine particles different from the transparent resin in terms of refractive index can also be used.

In this case, since light that has entered the light-guiding plate is diffused by the light-transmitting fine particles different from the transparent resin in terms of refractive index, the light can leave the surface of the light-guiding plate at a shorter distance and the amount of light leaking to adjacent light sources will be reduced to improve luminance.

(Embodiment 5)

Next, still another lighting unit based on embodiment 5 of the present invention is described below.

As mentioned above, two factors are important for the lighting units of the present invention. One is to improve the utilization efficiency of light, namely, to improve luminance by allowing light to leave the surface of the light-guiding plate efficiently without leaking to adjacent light sources after the light has entered the light-guiding plate. The other is to prevent, during the observation of images from a diagonal direction, the occurrence of nonuniformity of luminance due to the fact that the principal traveling direction of the light leaving the light-guiding plate located between light sources differs according to position.

In the embodiments described heretofore, it is possible to suppress light leakage to adjacent light sources and improve luminance (the utilization efficiency of light) by changing the shape or material of the light-guiding plate, and the occurrence of nonuniformity of luminance during observation from a diagonal direction can be solved by using an optical path changing means intended to correct the traveling direction of the outgoing light from the light-guiding plate.

During the resolution of the above-described two problems (factors), however, the present invention is not limited by the embodiments described heretofore, and these problems can likewise be solved using methods based on other viewpoints. For this reason, still another example of a lighting unit is described below.

Figure 19:
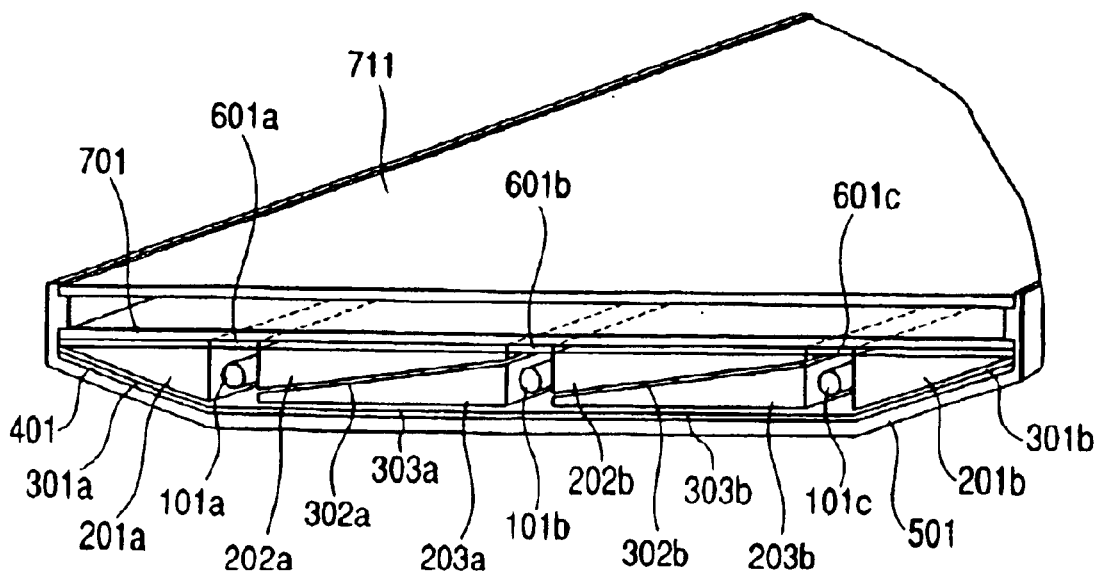
FIG. 19 is a partly cross-sectional schematic diagonal view showing a lighting unit based on the present invention.
Figure 20:
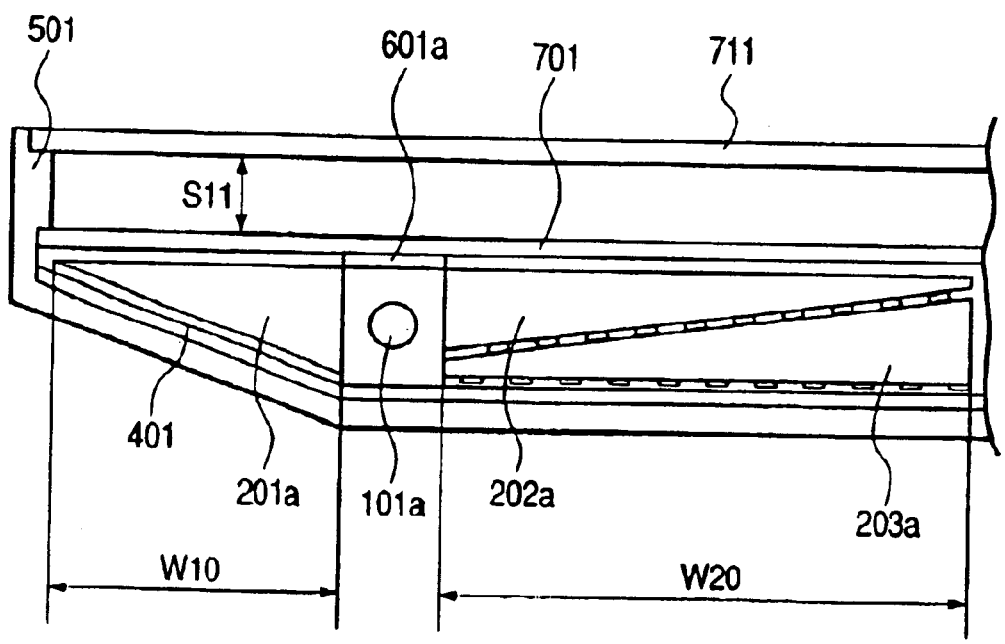
FIG. 20 is a partly cross-sectional schematic block diagram of another lighting unit based on the present invention.
Figure 21:
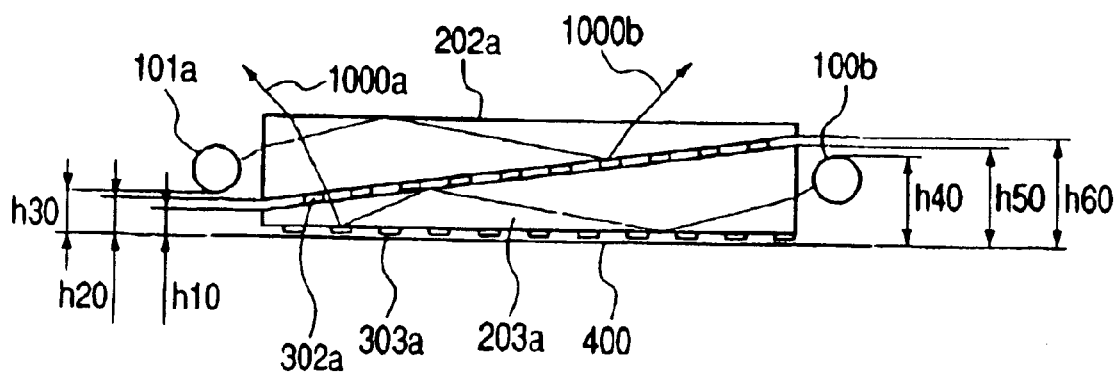
FIG. 21 is a partly cross-sectional schematic block diagram of another lighting unit based on the present invention.

FIG. 19 is a partly cross-sectional schematic diagonal view that shows still another example of a lighting unit based on the present invention. FIGS. 20 and 21 are partly cross-sectional schematic views of the lighting unit.

The lighting unit in FIG. 19 is characterized in that the light-guiding plate between light sources is formed by arranging two wedge-type plate-shaped members in laminated form. Details of the lighting unit pertaining to embodiment 5 are described below.

The lighting unit pertaining to embodiment 5 comprises: a plurality of light sources 101 (101a to 101c) that each have linear or bar-shaped light sources arranged in parallel; light-guiding plates (202a, 203a, 202b, and 203b) arranged along and between light sources 101; light-guiding plates (201a and 201b) arranged along the light sources in the area across each light source; a plurality of semi-transmitting reflection means 601 (601a to 601c) arranged directly above light sources 101; a first light diffusion means 701 so provided on the surfaces of light-guiding plates as to cover the entire surface of each light-guiding plate; a second light diffusion means 711 provided with a fixed clearance with respect to the first light diffusion means 701; a reflection means 401 provided on the reverse side of the light sources and light-guiding plates; and a frame 501.

Light sources 101 can be the same as those shown in the embodiments described above. In embodiment 5, three cold cathode fluorescent lamps are used as the light sources.

Light-guiding plates 201a, 201b, 202a, 202b, 203a, and 203b are all plate-like members made of a material transparent to visible light, such as acrylic resin, and each of these light-guiding plates has a wedge-form cross section. Also, light-guiding plates 202a and 202b and light-guiding plates 203a and 203b are respectively plate-like members made of the same material. In addition, light-guiding plates 202a and 203a are arranged in laminated form between light sources 101a and 101b, respectively, so as to have the respective inclined surfaces facing one another, and light-guiding plates 202b and 203b are arranged in laminated form between light sources 101b and 101c, respectively, so as to have the respective inclined surfaces facing one another. Light-guiding plates 201a and 201b are arranged so as to have their inclined surfaces facing downward, and light-guiding plates 201a, 201b, 202a, and 202b are all so arranged as to be flush with each other.

Details of the light-guiding plates are described below using FIGS. 20 and 21. First, the widths of the light-guiding plates are described using FIG. 20.

To achieve the uniformity in the in-plane luminance distribution of the light which has left the surface of each light-guiding plate, it is desirable that the width W10 of light-guiding plate 201 (in FIG. 20, 201a) should be limited to about half the width W20 of light-guiding plate 202 (in FIG. 20, 202a) and light-guiding plate 203 (in FIG. 20, 203a).

Next, the relationship between the heights of light sources and light-guiding plates is described using FIG. 21. In FIG. 21, although only one portion of the lighting unit is shown, all other portions thereof are of almost the same configuration.

It is desirable that light-guiding plate 201 (in FIG. 21, 202a) should face a light source and have two sides different in thickness. Also, the height "h20" of the lower end of the thick side should be less than the height "h30" of the lower end of the light source 101 corresponding to said thick side. Thus, light can be sent from the light source to the light-guiding plate more efficiently. In addition, the height "h60" of the lower end of the thin side should be greater than the height "h40" of the upper end of the light source corresponding to said thin side. Thus, light leakage to adjacent light sources due to absorption (and loss) by the phosphor within the adjacent light sources can be suppressed. Furthermore, it is desirable that in terms of the shape of light-guiding plate 203 (in FIG. 21, 203a), the height "h50" of the upper end of the thick side facing a light source should be greater than the height "h40" of the upper end of the light source corresponding to said side. Thus, light can be sent from the light source to the light-guiding plate more efficiently. The height "h10" of the upper end of the thin side should be less than the height "h30" of the lower end of the light source corresponding to said side. Thus, light leakage to adjacent light sources due to absorption (and loss) by the phosphor within the adjacent light sources can be suppressed.

Light diffuse reflection means 301 (in FIG. 19, 301a or 301b), light diffuse reflection means 302 (in FIG. 21, 302a), and light diffuse reflection means 303 (in FIG. 21, 303a) can be formed on the inclined surface (see FIG. 20) that forms the reverse side of light-guiding plate 201, the inclined surface that forms the reverse side of light-guiding plate 202 (in FIG. 21, 202a), and the flat surface that forms the reverse side of light-guiding plate 203 (in FIG. 21, 203a), by patterning with a white pigment (or transparent media and light-transmitting fine particles different from the transparent media in terms of refractive index) so that light will be uniformly radiated from the surface of the lighting unit. It is important in this case that the light diffuse reflection means 302 (in FIG. 21, 302a) and the light diffuse reflection means 303 (in FIG. 21, 303a) should be patterned in offset form in order to prevent the combination of light diffuse reflection means 302 and light diffuse reflection means 303 from intercepting the light that has sent to the light-guiding plates, and thus in order for the light to be radiated from the lighting unit properly. Also, although light-guiding plate 202 (in FIG. 21, 202a) and light-guiding plate 203 (in FIG. 21, 203a) are arranged in laminated form, since firm contact between the laminated light-guiding plates causes the nonuniformity of luminance at the contact portion, these light-guiding plates need to be laminated via a fixed air layer. Light diffuse reflection means 302 (in FIG. 21, 303a) that is provided on the reverse side of light-guiding plate 202 (in FIG. 21, 202a) by patterning with a white pigment or the like, also functions as a spacer to prevent the light-guiding plates from coming into firm contact with one another. The use of such a light diffuse reflection means makes it unnecessary to provide an alternative means, and also has the advantage that manufacturing processes can be simplified. Although, in embodiment 5, the reverse side of each light-guiding plate has a light diffuse reflection means patterned with a white pigment or the like, the present invention is not limited by this arrangement, and the light diffuse reflection means can be constructed by forming on the reverse side of each light-guiding plate a light diffusion means that consists of a great number of very small undulations or stepped portions including an inclined surface. In any case, however, it is important that the light diffuse reflection means formed on the reverse side of light-guiding plate 202 (in FIG. 21, 202a) should be constructed so as to minimize the interception of the light that has left the surface of light-guiding plate 203 (in FIG. 21, 203a).

Once again, semi-transmitting reflection means 601 is described below using FIG. 19.

A plurality of semi-transmitting reflection means (601a to 601c) are arranged directly above light sources 101a to 101c. Semi-transmitting reflection means 601a to 601c have a function by which, of all the light leaving the light sources 101a to 101c, only one portion of the light going upward will be transmitted and the rest will be reflected to go towards the side walls of each groove in each light-guiding plate. Thus, the amount of light entering the light-guiding plate from the planes of incidence thereon. Semi-transmitting reflection means 601a to 601c also have a function that improves the in-plane uniformity of luminance by preventing luminescent lines from occurring directly above each light source. For this reason, the light-emitting intensity of the light source and the luminance of the light passed along the light-guiding plates should be taken into consideration when the transmittance of light of the semi-transmitting reflection means is set, and this value should be set to a value smaller than the reflectance of the light. It is also desirable that the light, when transmitted, should be scattered for enhanced in-plane uniformity of its luminance. In addition, to improve the utilization efficiency of light, it is desirable that semi-transmitting reflection means 601a to 601c should use a material as low as possible in terms of light absorption coefficient. More specifically, the functions of the semi-transmitting reflection means can be implemented by including air or fine-structured transparent bodies or white pigments (or the like) of different reflectances in a transparent substrate or by coating a transparent supporting substrate with a white pigment or by coating or printing the immediate top of the light source of the light-guiding plate directly with a white pigment.

Reflection means 401 is positioned at the bottoms of the light sources and the light-guiding plates. Reflection means 401 has a function that reflects the outgoing light from light sources 101a to 101c and increases the amount of light which enters the light-guiding plates, and a function that reflects upward the light that may have leaked from the reverse side of each light-guiding plate. Reflection means 401 can be the same as the reflection means 400 described in embodiments 1 to 4.

A first light diffusion means 701 is provided over the entire surfaces of light-guiding plates 201a, 201b, 202a, and 202b. The first light diffusion means 701 achieves the uniformity in the outgoing angle distribution of the light leaving the light-guiding plates, and the in-plane uniformity in the luminance of the light. The first light diffusion means 701 can also be the same as the light diffusion means 700 described in embodiments 1 to 4. Also, the first light diffusion means 701 can support semi-transmitting reflection means 601a to 601c that are made of, for example, a white pigment. More specifically, the first light diffusion means 701 and semi-transmitting reflection means 601a to 601c can be constructed by printing a white pigment on the reflection sheet functioning as the first light diffusion means 701. In this case, the white pigment directly above the light sources should be printed thickly and without a clearance so that as the distance from the immediate top of the light sources is increased, the printing area of the white pigment for shielding will be continuously reduced. This method allows for the relationship between the distance from the light sources and the intensity of light, and is useful for achieving the uniformity of light. Or the light diffusion means can also be supported by arranging transparent sheets, transparent plates, or other supporting members, on the light-guiding plates and then printing semi-transmitting reflection means 601 on these supporting members.

On the first light diffusion means 701, a second light diffusion means 711 is positioned with a fixed clearance of S11. As with the first light diffusion means 701, the second light diffusion means 711 is intended to achieve the uniformity in the outgoing angle distribution of the light leaving the light-guiding plate, and the in-plane uniformity in the luminance of the light. The second light diffusion means 711 can also be the same as the second light diffusion means 710 described in embodiments 1 to 4. As described in the above embodiment, separating the light diffusion means into two layers (a first light diffusion means 701 and a second light diffusion means 711) and providing a fixed clearance between the first light diffusion means 701 and the second light diffusion means 711 makes it possible to obtain more uniform luminance distributions than by arranging continuously a plurality of light diffusion means of the same performance in laminated form.

Figure 22:
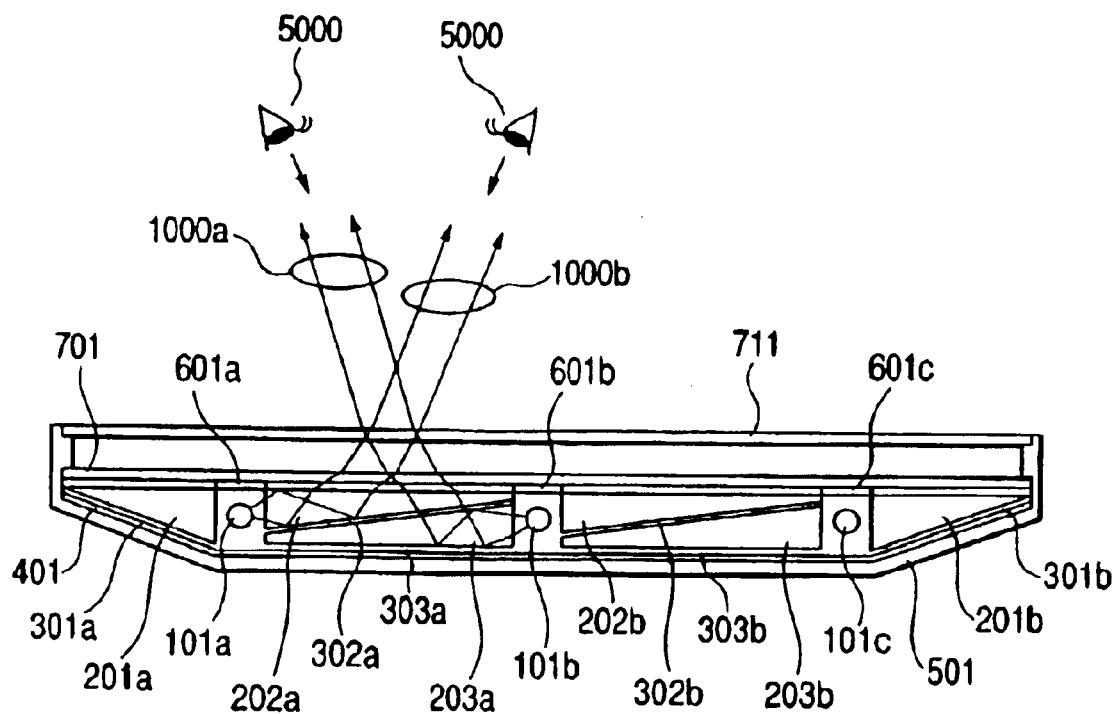
FIG. 22 is a partly cross-sectional schematic block diagram of another lighting unit based on the present invention.

The working effect of the entire lighting unit in embodiment 5 is described below using FIG. 22. FIG. 22 is a schematic cross-sectional view of a lighting unit based on the present invention.

After light has been radiated from light sources 101a to 101c and then reflected directly or via reflection means 401 and/or the like, the light enters adjacent light-guiding plates. Although one part of the light that has reached semi-transmitting reflection means 601a to 601c is transmitted, the remainder reflects and then enters the light-guiding plates directly or via light sources and reflection means 401. And light that has entered the light-guiding plates propagates along the surface and reverse of each light-guiding plate while repeatedly reflecting. However, of all the light that has reflected at the light diffuse reflection means provided on the reverse side of each light-guiding plate, only light that has entered the surface of the light-guiding plate at an angle deviating from the conditions of total reflection, namely, an angle smaller than its critical value, leaves the surface of the light-guiding plate.

Light that has thus left the light-guiding plate is enhanced in terms of the uniformity in in-plane luminance distribution and the uniformity in traveling direction, by the first light diffusion means 701 and the second light diffusion means 711, and then the light is radiated from lighting unit.

Next, the traveling directions of light and the working effects obtainable by combining two types of light-guiding plates (202 and 203) are briefly explained with attention being paid to the area between light sources 101a and 101b. Of course, similar working effects can also be obtained for the light-guiding plates between other light sources.

Outgoing light from light source 101a mainly enters light-guiding plate 202a. After this, however, as described earlier, light leaves the surface of the light-guiding plate and the top of the lighting unit by the action of light diffuse reflection means 302a and becomes outgoing light 1000b. The outgoing light from the light source is also considered to undergo the same processes. That is to say, the light, after entering light-guiding plate 203a, is scattered/reflected by light diffuse reflection means 303a and leaves the top of the lighting unit via a light-guiding plate to become outgoing light 1000a. Although both outgoing light 1000a and outgoing light 1000b have the uniformity in their in-plane distributions of luminance and their traveling directions enhanced by the first and second light diffusion means, outgoing light 1000a and outgoing light 1000b are not perfectly parallel to the normal direction at the planes of the lighting unit (for example, the plane of the light diffusion means). They differ in traveling direction. However, since they leave the same area, the difference in the traveling direction of the light is not recognized as the nonuniformity of luminance by viewer 5000 who observes (views) the area between light sources 101a and 101b. In short, in the lighting unit of embodiment 5, the nonuniformity of luminance does not occur during observation from a diagonal direction and the luminance itself can be improved.

Compared with the conventional lighting units that use flat-plate type light-guiding plates, the lighting unit of embodiment 5 reduces the amount of light lost by leaking to adjacent light sources, since two light-guiding plates having a wedge-form cross section and consisting of plate-like members are arranged in laminated form between light sources. In other words, high luminance can be obtained because of decreases in the amount of light which becomes unusable as lamp light for reasons such as absorption and dissipation by adjacent light sources.

In embodiment 5, even if the optical path changing means used in embodiments 1 to 4 is not provided, the nonuniformity of luminance does not occur during observation from a diagonal direction. However, since the luminance in the front direction can be improved by 1.3 to 1.5 times by providing at the top of the light-guiding plate the optical path changing means used in embodiments 1 to 4, it is useful to provide this optical path changing means in embodiment 5 as well.

(Embodiment 6)

Next, display equipment using a lighting unit based on the present invention is described below.

Figure 13:
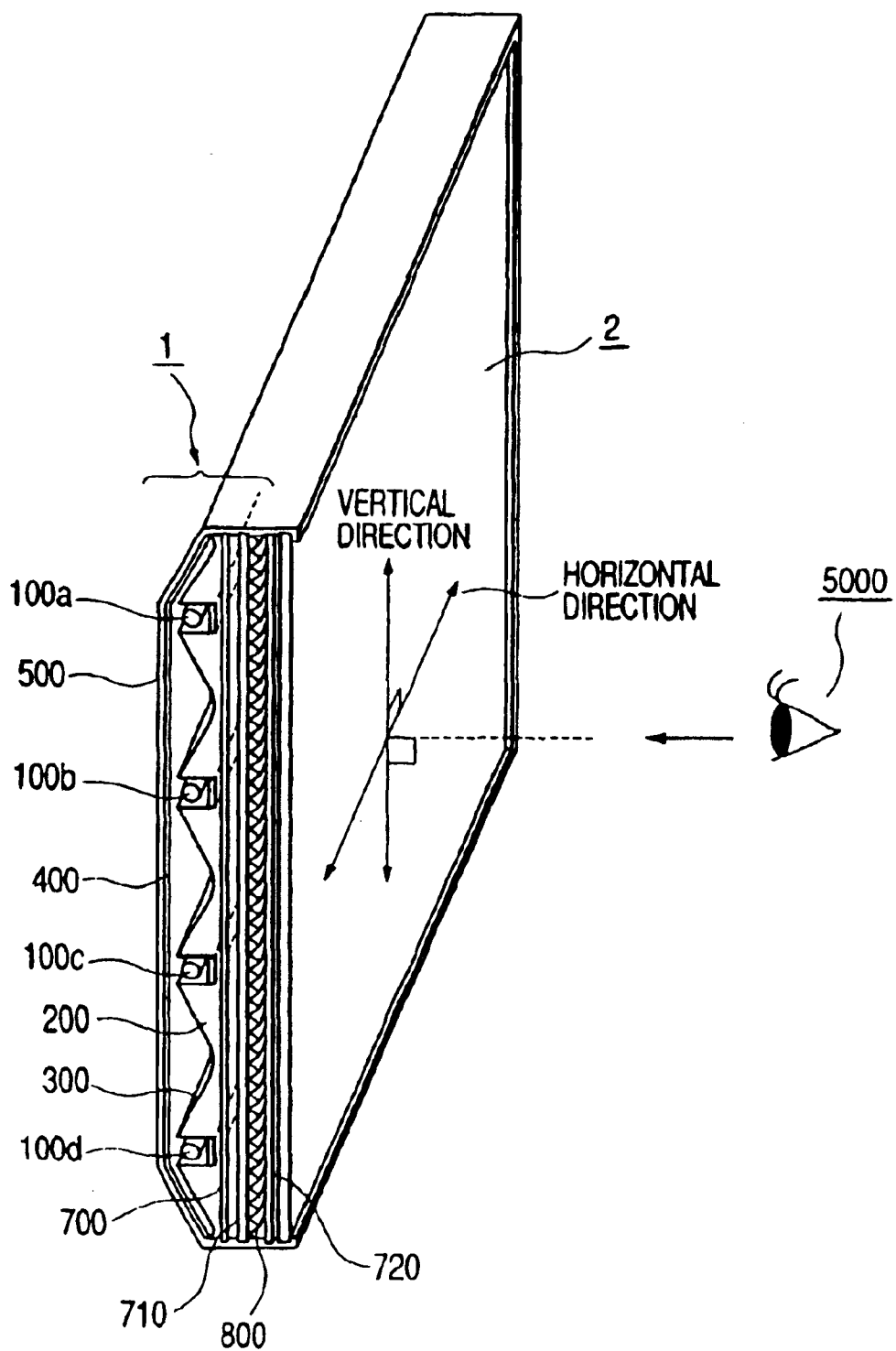
FIG. 13 is a partly cross-sectional schematic diagonal view showing both a lighting unit based on the present invention and the display equipment that uses the lighting unit.

FIG. 13 is a partly cross-sectional schematic diagonal view of display equipment based on the present invention. The display equipment has a display panel 2, which displays images by controlling the amount of light transmission according to image information, and a lighting unit 1, which lights the display panel from rear.

A display panel for displaying images by controlling the amount of incident light transmission can be used as display panel 2, and an LCD panel, in particular, is useful since it is long-lived and can make matrix displays.

The major available display modes of an LCD panel include GH (Guest Host), PC (Phase Change), TN (Twisted Nematic), STN (Super Twisted Nematic), ECB (Electrically Controlled Bi-rerefringence), PDLC (Polymer Dispersed Liquid Crystal), IPS (In-Plane Switching), MVA (Multi-domain Vertical Aligned), etc. To achieve better image quality, however, it is desirable that a display mode for displaying images by using a polarizing plate and changing the polarized status of the light entering the liquid-crystal layer should be used as a display mode that enables a high contrast ratio to be obtained at low driving voltage. The driving schemes used for LCD panels can be broadly divided into two major types: active matrix driving, which uses switching devices such as TFTs (Thin Film Transistors), and multiplex driving. The driving scheme is combined with either of the display modes mentioned above.

The lighting unit described in embodiment 1 is used as lighting unit 1. Display panel 2 usually uses a display screen having an aspect ratio of either 3:4, 4:5, or 9:16, and is installed so that the longitudinal direction of the display screen agrees with its horizontal direction. At this time, since light sources 100 (100a to 100d) are configured so that their longitudinal direction essentially agrees with the longitudinal direction, or horizontal direction, of the display screen of display panel 2, it is desirable that the longitudinal direction of the prism forming the corrugated surface of optical path changing means 800 should also essentially agree with the horizontal direction of the display screen of display panel 2.

Under such a configuration, light radiated from lighting unit 1 will maintain its in-plane uniformity and be converged in the vertical direction of the display screen. In other words, the angle-of-view of the luminance in the horizontal direction of the display screen is wider than in the vertical direction. This agrees with the fact that general display equipment is required to have a wider angle-of-view of luminance in its horizontal direction than in its vertical direction, and is very effective since limited light can be allocated to viewers 5000 efficiently.

(Embodiment 7)

Figure 23:
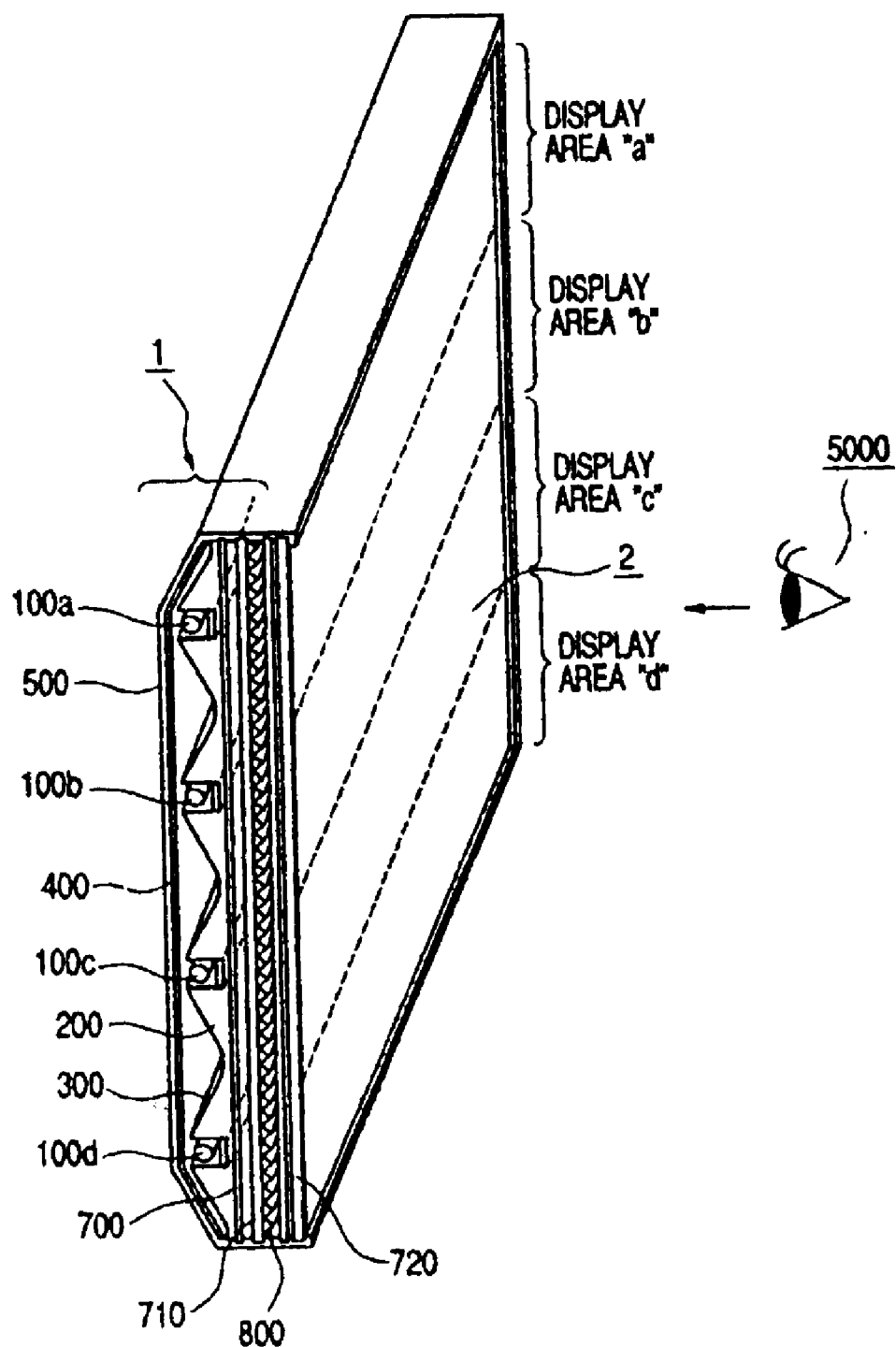
FIG. 23 is a partly cross-sectional schematic diagonal view showing both another lighting unit based on the present invention and the display equipment that uses the lighting unit.
Figure 24:
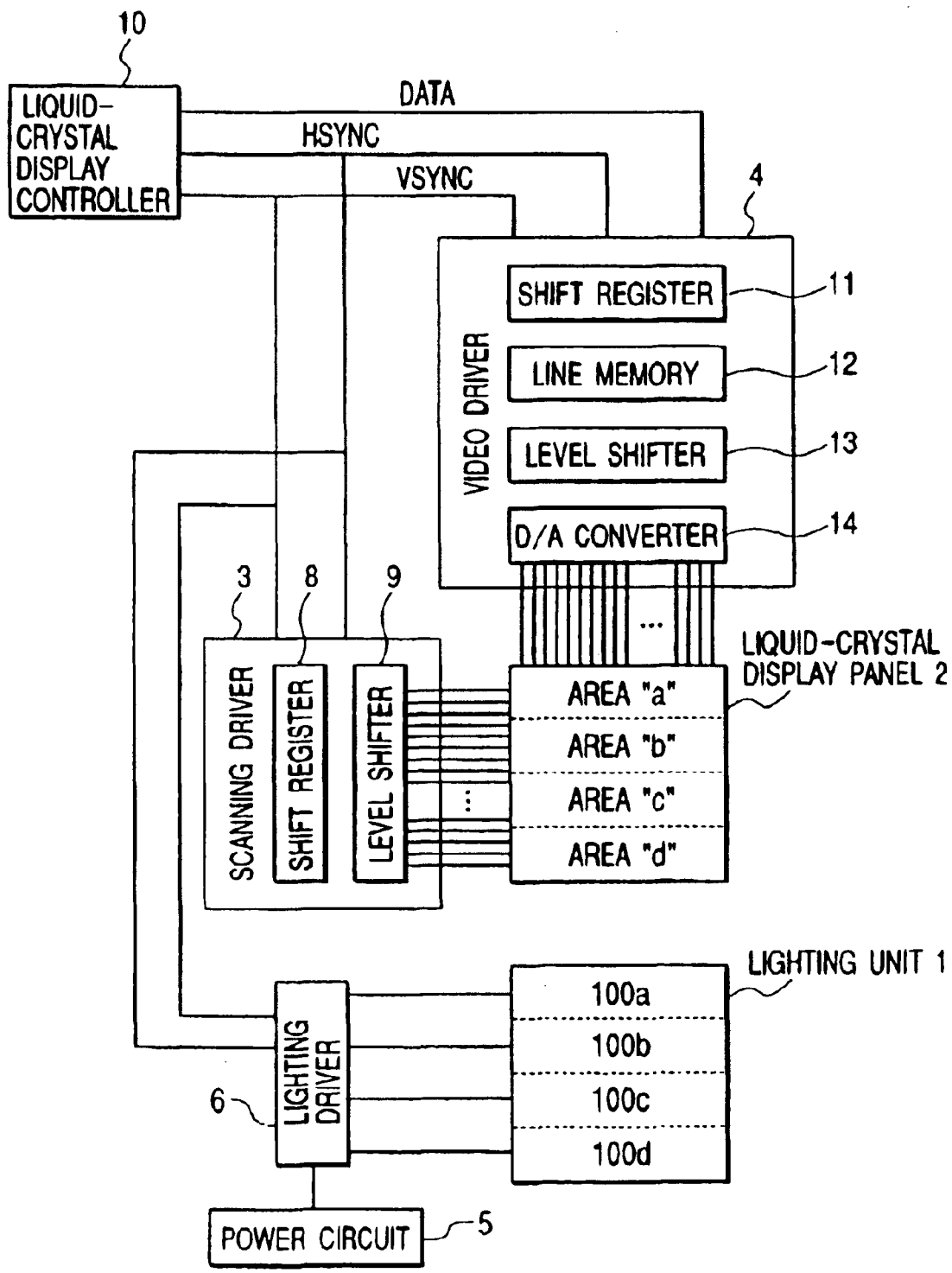
FIG. 24 is a schematic block diagram of display equipment based on the present invention.

Next, another lighting unit based on the present invention, and an embodiment of display equipment using this lighting unit are described using drawings. FIG. 23 is a partly diagonal schematic view showing the configuration of display equipment based on the present invention. FIG. 24 is a schematic block diagram showing the display equipment set forth in this embodiment.

The display equipment consists of an LCD panel 2 functioning as its display panel, and a lighting unit 1 capable of dividing independently the display screen located at the rear of the LCD panel 2.

Lighting unit 1 is so constructed as to light independently the display areas obtained by dividing LCD panel 2 into multiple sections. The lighting of each display area is independently controlled according to the particular operation of LCD panel 2.

The lighting unit in this embodiment should, basically, be the unit described in embodiment 1. Hereinafter, description is made on the assumption that cold cathode fluorescent lamp are used as light sources. This, however, does not limit the present invention. Sections common to the above-mentioned embodiment are not described in detail.

Scanning driver 3 (scan electrode driving circuit) and video driver 4 (pixel electrode driving circuit) are connected to LCD panel 2, and power circuit 5 and lighting driver 6 (lighting control circuit) are connected to lighting unit 1. Liquid-crystal controller 10 is further connected to scanning driver 3 (scan electrode driving circuit), video driver 4 (pixel electrode driving circuit), and lighting driver 6 (lighting control circuit).

In this configuration, in order to optimize full-motion image display resolution according to the particular display status of LCD panel 2, lighting driver 6 controls the activation and deactivation of the light sources 100a to 100d which form the lighting unit 1, and thus the display screen of the LCD panel 2 is divided for lighting. Since, as described earlier, lighting unit 1 is constructed so that the light that has entered the light-guiding plate leaves the surface thereof at a short distance, light leakage to adjacent light sources is suppressed and specific areas can be lit using the light radiated from individual light sources. Therefore, specific areas of the LCD panel 2 can be independently lit by activating and deactivating each light source independently.

LCD panel 2 should use crystal liquids that are 9 msec or less in terms of response time. A fast-response LCD panel uses ferroelectric crystal liquids or is of the OCB (Optically Compensated Bend) mode. A TN LCD panel or IPS LCD panel that uses liquid crystal (LC) materials of low viscosity to obtain a thin LC layer can satisfy the requirements mentioned above.

In this embodiment, a normally closed type of IPS LC panel about 2 microns in terms of LC layer thickness and 9 msec or less in terms of response time including a medium tone, is used as LCD panel 2. The present invention, however, is not limited by this.

Liquid-crystal (LC) controller 10 acquires signals from an external unit and sends the data to be displayed on LCD panel 2. At this time, horizontal sync signal HSYNC and vertical sync signal VSYNC are also sent. The configuration of the LC controller 10 differs according to the type of input signal. First, input of analog signals to LC controller 10 is described below. In this case, the signal components to be displayed on LCD panel 2, and an image starting signal denoting the start of an image signal for each pixel are superimposed to form an analog signal. LC controller 10 contains an A/D converter, and this controller acquires image signal from the superimposed analog signal components and then after converting the image signal into digital form by activating the A/D converter, sends the digital signal as data to the display panel. Also, the image starting signal within the analog signal components is sent as vertical sync signal VSYNC, and the sampling clock at the A/D converter is sent as horizontal sync signal HSYNC.

When the input signal to LC controller 10 is a digital signal, this signal is sent as the data created by an external arithmetic processing unit. In this case, since the external arithmetic processing unit performs computations based on horizontal sync signal HSYNC and vertical sync signal VSYNC, LC controller 10 receives data, horizontal sync signal HSYNC, and vertical sync signal VSYNC and then transfers the data, horizontal sync signal HSYNC, and vertical sync signal VSYNC, as they are.

After being sent from LC controller 10, horizontal sync signal HSYNC and vertical sync signal VSYNC are sent to scanning driver 3. Scanning driver 3 uses shift register 8 to create signals for each scan electrode of the LCD panel 20, and uses level shifter 9 to determine the signal levels for each scan electrode and send these signals.

Image driver 4 receives data, horizontal sync signal HSYNC, and vertical sync signal VSYNC from LC controller 10. The data is sent to shift register 11 and then sent to line memory 12 as one line of data. Next, levels are determined by level shifter 13 and the signals are converted into analog form by D/A converter 14. The analog signals that have thus been obtained are sent as the signals to each pixel electrode of the LCD panel 2.

Next, lighting driver 6 that controls the light sources 100a to 100d which form lighting unit 1, is described. Lighting driver 6 is connected to power circuit 5 and light sources 100a to 101d, and independently controls the activation and deactivation of each such light source in order to minimize decreases in resolution during full-motion image display.

Figure 25:
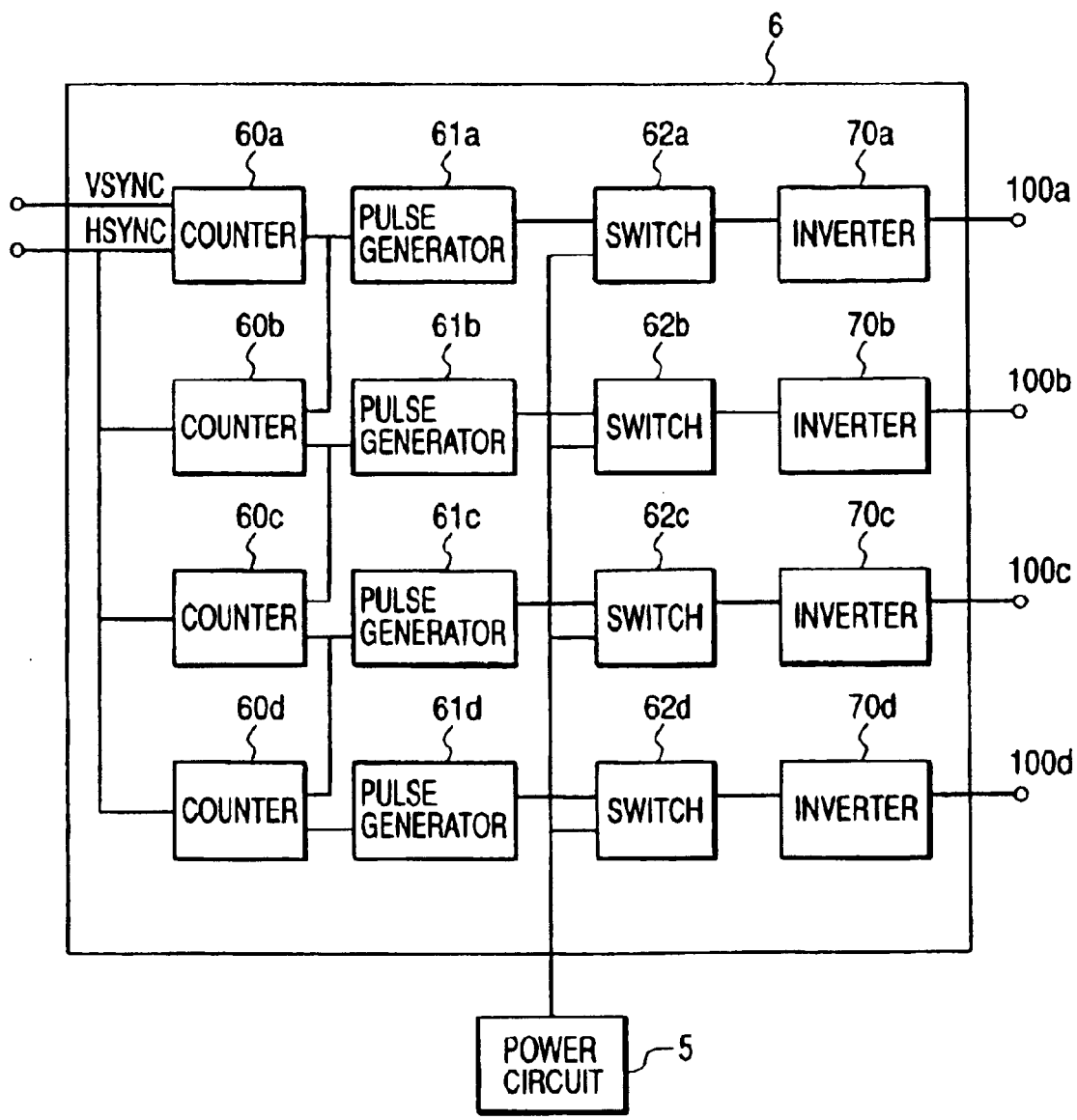
FIG. 25 is a schematic block diagram of the lighting driver pertaining to the present invention.

FIG. 25 shows the structure of lighting driver 6. Lighting driver 6 consists of counters 60a, 60b, 60c, and 60d, pulse generators 61a, 61b, 61c, and 61d, switches 62a, 62b, 62c, and 62d, and inverters 70a, 70b, 70c, and 70d. Counters 60a to 60d receive horizontal sync signal HSYNC and count the pulse rate of this horizontal sync signal. Also, counter 60a receives vertical sync signal VSYNC and uses this signal as the trigger signal for the start of counting. Likewise, counters 60b, 60c, and 60d receive the output signals of counters 60a, 60b, and 60c, respectively, as the trigger signal for starting the respective counting operations. Pulse generators 61a to 61d, after receiving the outputs of counters 60a to 60d, sends high-level signals for a predetermined time. Switches 62a to 62d turn on when the signals from pulse generators 61a to 61d are high in level, with the result that power is supplied from the power circuit to inverters 70a to 70d so as to activate light sources 100a to 101d.

Next, the operation of the lighting unit in this embodiment is described below. The description here assumes that the cycle time of the vertical sync signal VSYNC is 16.6 msec, that the cycle time of the horizontal sync signal HSYNC is 15 microsec, and that it takes 9 msec for the lighting unit to scan the entire display screen of the LCD panel 2 whose resolution is 800 pixels by 600 pixels.

As described above, lighting unit 1 of this embodiment can independently light each display area of the display screen of the LCD panel 2 by controlling the activation and deactivation of light sources 100a to 10d. The light source taking charge of each display area provides control so as to ensure that only after the scanning of the corresponding display area of the LCD panel 2 has been started and completed and the LCs have responded, will lamp light be radiated. For this reason, in display area "a" of the LCD panel 2, light source 100a is activated 11.25 msec after the start of scanning, and radiates lamp light only for an interval of 5.35 msec. Likewise, in display area "b", light source 100b is activated 13.5 msec after the start of scanning, and radiates light only for 5.35 msec; in display area "c", light source 100c is activated 15.75 msec after the start of scanning, and radiates light only for 5.35 msec; and in display area "d", light source 100d is activated 18.0 msec after the start of scanning, and radiates light only for 5.35 msec.

In order to achieve the above, counter 60a sends its output signal when 750 horizontal sync signals are counted. Similarly, counter 60b, after counter 60a has sent its output signal, sends an output signal when 150 horizontal sync signals are counted; counter 60c, after counter 60b has sent its output signal, sends an output signal when 150 horizontal sync signals are counted; and counter 60d, after counter 60c has sent its output signal, sends an output signal when 150 horizontal sync signals are counted.

Pulse generators 61a to 61d receive output signals from each counter and then send high-level signals for an interval of 5.35 msec.

If an image moving at an angle-of-view speed of 10 degrees/sec is displayed under the above conditions, the indistinctness of the image cannot be detected. In other words, LCD equipment capable of displaying full-motion images in natural form can be achieved.

When the light sources of a lighting unit are to be activated only after its display screen has fully responded as in prior art, if an LCD panel is used that is 9 msec in the same full-scanning time as that of this embodiment and 9 msec in the response time of the LCs, the activation of the lighting unit will require 18 msec. In this case, if one frame of time is equal to 16.6 msec, the intended function of the display equipment cannot be implemented since a sufficient activation time cannot be provided for the light sources.

In this embodiment, there is no need to wait for the light sources to turn on until the display screen of the LCD panel, in particular, has fully responded. That is to say, since the light sources can be left off only for the short response time of small display areas, a sufficient activation time can be provided for the light sources. Thus, LCD equipment capable of displaying full-motion images in natural form can be achieved.

For an LCD panel that uses ferroelectric liquid crystals or other high-speed response liquid crystals, it is possible even with prior art to provide a sufficient activation time for the light sources. In this case, since the use of display equipment based on the present invention enables a long activation time to be provided for the light sources, the display equipment can offer high screen luminance.

When, as in this embodiment, an deactivation time is provided for the light sources, unless the amount of outgoing light during activation is increased, display luminance will decrease, compared with the case that the light sources remain turned on. The amount of outgoing light during the activation of the light sources can be increased by increasing input power per light source or reducing the number of light sources.

To increase the input power to the light sources, if these light sources are cold cathode fluorescent lamps, the amount of outgoing light from the light sources can be increased by increasing the normally "on" tube current of 5–6 mA to 10 mA. Although the maximum tube current that can be applied to the fluorescent lamps is limited, when the light sources are to be blinked, a greater amount of tube current can be applied, compared with the case that they are to remain turned on. Given the same tube current, therefore, lamp life is longer than in the latter case.

Figure 26:
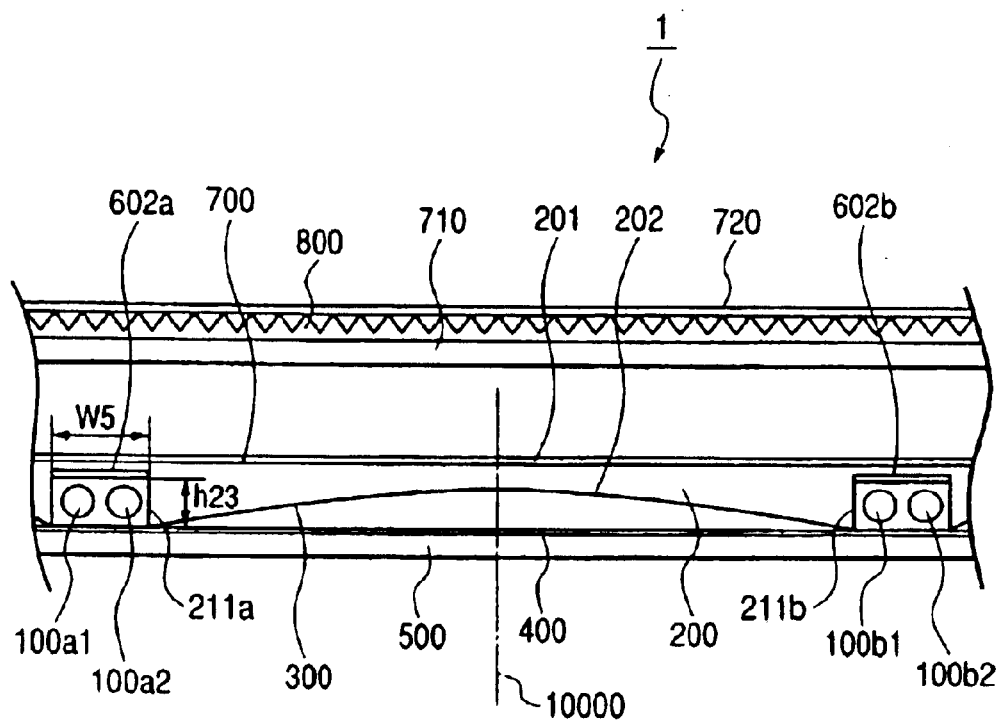
FIG. 26 is a partly cross-sectional schematic block diagram of another lighting unit based on the present invention.
Figure 27:
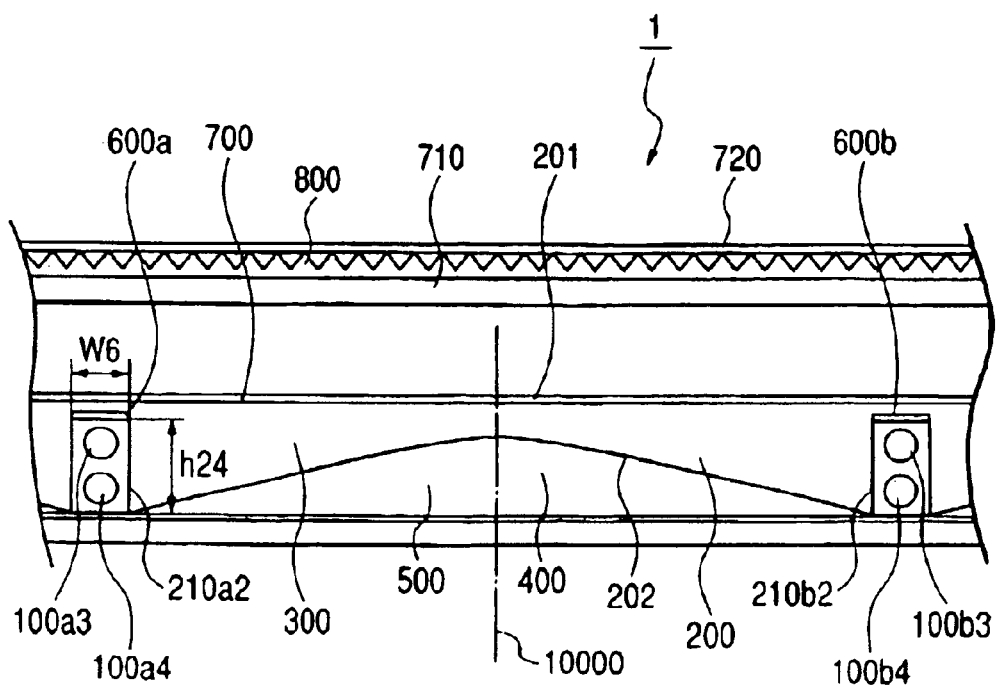
FIG. 27 is a partly cross-sectional schematic block diagram of another lighting unit based on the present invention.
Figure 28:
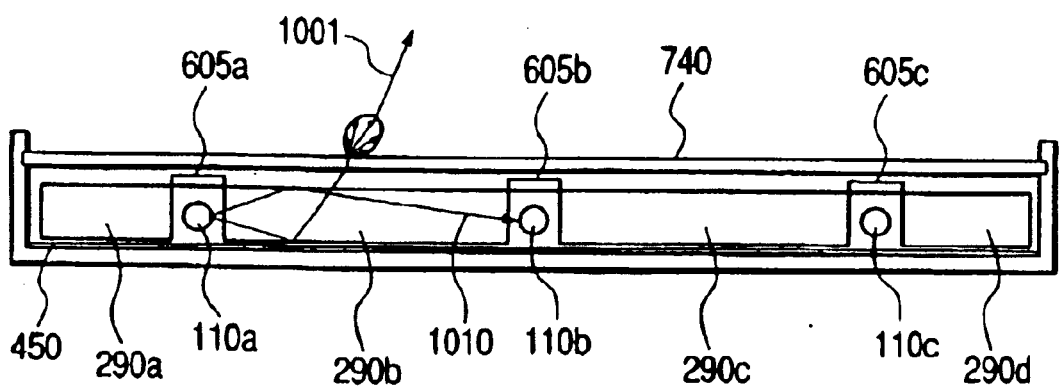
FIG. 28 is a schematic block diagram of a conventional lighting unit.
Figure 29:
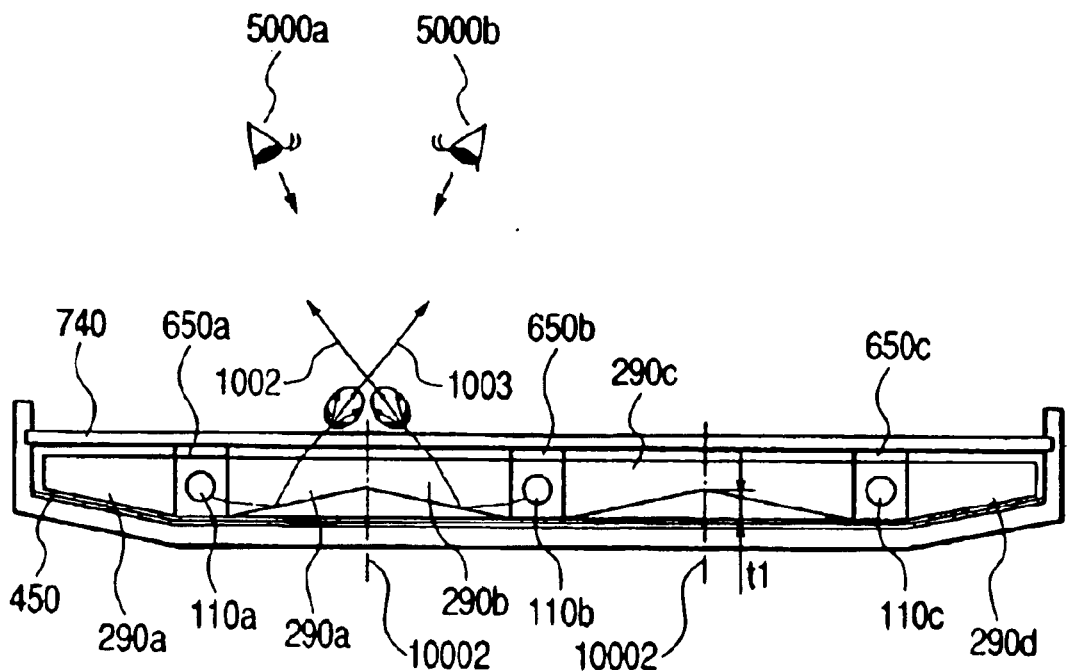
FIG. 29 is a schematic block diagram of another conventional lighting unit.

An increase in the number of light sources can be achieved by reducing the arrangement pitch of the light sources or by, as shown in FIGS. 26 and 27, arranging a plurality of light sources in one groove of the light-guiding plate, namely, arranging a plurality of light sources for one plane of incidence on the light-guiding plate. Both FIGS. 26 and 27 are a schematic block diagram showing a lighting unit of the present invention in partial cross section. FIG. 26 shows a lighting unit with two light sources arranged horizontally in parallel in one groove of the light-guiding plate (in the figure, light sources 100a1 and 100a2 are arranged horizontally in parallel to one another, and light sources 100a1 and 100a2 are arranged horizontally in parallel). FIG. 27 shows another lighting unit with two light sources arranged vertically in one groove of the light-guiding plate (in the figure, light sources 100a3 and 100a4 are arranged vertically, and light sources 100b3 and 100b4 are arranged vertically).

To arrange light sources horizontally in parallel to one another, the height "h23", of the planes-of-incidence (in the figure, 211a2, 211b2) on the light-guiding plate should be 4.0 mm, which is the same as in the above embodiment, and the width "W5" of the light source accommodation grooves in the light-guiding plate should be 9 mm, which is about twice the corresponding value shown in the above embodiment. Therefore, semi-transmitting reflection means 602 (in the figure, 602a and 602b) should also be about twice as wide as the equivalent shown in the above embodiment. Other parameters should be in line with the main purport of the lighting unit pertaining to the present invention.

To arrange light sources vertically, the width "W6" of the grooves should be the same as in embodiment 1, and the height "h24" of the planes-of-incidence (in the figure, 210a2, 210b2) on the light-guiding plate should be 8.0 mm, which is about twice as great as in the above embodiment. Other parameters should be in line with the main purport of the lighting unit pertaining to the present invention.

For these lighting units, the following effects can be obtained by arranging a plurality of light sources in one groove of the light-guiding plate.

In the case that only one light source is provided in one groove of the light-guiding plate, that is to say, that only one light source is provided for one plane of incidence on the light-guiding plate, if the light source cannot be activated, the display screen cannot be fully lit and the corresponding display area deteriorates in visibility. However, when a plurality of light sources are arranged for one plane of incidence on the light-guiding plate as shown in this embodiment, even if one light source cannot be activated for reasons such as expiration or trouble, the remaining light sources enable the visibility of the display screen to be achieved. Such an arrangement is therefore effective in that a sudden operational failure does not occur.

When cold cathode fluorescent lamps are used as the light sources, if these light sources are not uniformly coated with a phosphor, luminance and color may not be uniform. Uniform lamp light, however, can be obtained by arranging a plurality of light sources for one plane of incidence on the light-guiding plate in such a manner that any nonuniformity of luminance and color will be offset. For the nonuniformity of luminance and color according to the particular direction of coating with the phosphor, more uniform lamp light can be obtained by arranging an even number of light sources in such a manner that they will be coated with the phosphor in the opposite direction to one another.

As described heretofore, according to the present invention, lighting units can be achieved that are high in luminance and uniform in the in-plane distribution of lamp light. The use of these lighting units also enables high-quality display equipment to be constructed.

What is claimed is:

1. A lighting unit comprising
   a plurality of linear or bar-shaped light sources arranged in parallel,
   a light-guiding plate having a plurality of grooves to accommodate said light sources,
   a light diffuse reflection means provided at either one side of said light-guiding plate,
   a first light diffusion means provided at the side opposite to that which faces the light diffuse reflection means of the light-guiding plate, and
   a light semi-transmitting reflection means provided between each light source and said light diffusion means,
   wherein said lighting unit is characterized in that a second light diffusion means is further located with a clearance at the side opposite to that which faces the light-guiding plate of the first light diffusion means.

2. A lighting unit comprising
   a plurality of linear or bar-shaped light sources arranged in parallel,
   light-guiding plates arranged along both longitudinal sides of said light sources, a light diffuse reflection means provided at either one side of each of said light-guiding plates,
   a first light diffusion means provided at the side opposite to that which faces the light diffuse reflection means of each light-guiding plate, and
   a light semi-transmitting reflection means provided between each light source and said light diffusion means,
   wherein said lighting unit is characterized in that a second light diffusion means is further located with a clearance at the side opposite to that which faces the light-guiding plate of the first light diffusion means.

3. A lighting unit comprising
   a plurality of linear or bar-shaped light sources arranged in parallel,
   light-guiding plates arranged along both longitudinal sides of said light sources, a light diffuse reflection means provided at either one side of each of said light-guiding plates,
   a first light diffusion means provided at the side opposite to that which faces the light diffuse reflection means of each light-guiding plate, and
   a light semi-transmitting reflection means provided between each light source and said light diffusion means,
   wherein said lighting unit is characterized in that each of said light-guiding plates has a cross section made of laminated wedge-type plate-shaped members.

* * * * *